United States Patent [19]
Sowinski et al.

[11] Patent Number: 6,021,277
[45] Date of Patent: Feb. 1, 2000

[54] ONE-TIME-USE CAMERA PRELOADED WITH COLOR NEGATIVE FILM ELEMENT

[75] Inventors: Allan F. Sowinski; Richard P. Szajewski; Lois A. Buitano, all of Rochester; John D. Buhr, Webster; Frank R. Brockler, Macedon, all of N.Y.

[73] Assignee: Eastman Kodak Company, Rochester, N.Y.

[21] Appl. No.: 09/104,738

[22] Filed: Jun. 25, 1998

[51] Int. Cl.$^7$ ................................................ G03B 17/02
[52] U.S. Cl. ................................................ 396/6; 396/661
[58] Field of Search ........................ 396/6, 661; 430/502, 430/503, 504, 505, 506

[56] References Cited

U.S. PATENT DOCUMENTS

| | | | |
|---|---|---|---|
| 4,524,130 | 6/1985 | Iwasa et al. | 430/505 |
| 4,777,102 | 10/1988 | Levine | 430/21 |
| 4,941,039 | 7/1990 | E'Errico | 358/80 |
| 5,183,727 | 2/1993 | Schmittou et al. | 430/372 |
| 5,219,715 | 6/1993 | Sowinski et al. | 430/376 |
| 5,254,441 | 10/1993 | Pearce et al. | 430/382 |
| 5,267,030 | 11/1993 | Giorgianni et al. | 358/527 |
| 5,298,376 | 3/1994 | Szajewski et al. | 430/505 |
| 5,300,417 | 4/1994 | Lushington et al. | 430/536 |
| 5,314,793 | 5/1994 | Chang et al. | 430/506 |
| 5,314,794 | 5/1994 | Sutton | 430/506 |
| 5,318,880 | 6/1994 | English et al. | 430/393 |
| 5,322,766 | 6/1994 | Sowinski et al. | 430/505 |
| 5,360,703 | 11/1994 | Chang et al. | 430/506 |
| 5,389,506 | 2/1995 | Sutton | 430/509 |
| 5,422,231 | 6/1995 | Nozawa | 430/508 |
| 5,466,560 | 11/1995 | Sowinski et al. | 430/347 |
| 5,500,316 | 3/1996 | Bogdanowicz et al. | 430/21 |
| 5,519,510 | 5/1996 | Edgar | 358/471 |
| 5,674,665 | 10/1997 | Sawyer et al. | 430/383 |
| 5,705,327 | 1/1998 | Brewer et al. | 430/504 |

OTHER PUBLICATIONS

*The British Journal of Photography Annual* of 1988, pp. 196–198.

*Primary Examiner*—Eddie C. Lee
*Attorney, Agent, or Firm*—Paul A. Leipold

[57] ABSTRACT

A one-time-use camera preloaded with a color negative silver halide photographic element is disclosed. The element is capable of producing images after imagewise exposure that, when developed, converted to electronic form, digitally corrected and then converted to a viewable form, exhibit excellent color, reduced granularity and improved sharpness. The photographic elements contain blue, green and red recording layer units capable of forming spectrally differentiated dye images. The layer units are substantially free of colored masking coupler, and each exhibit a dye image gamma of less than 1.5. The element exhibits an exposure latitude of at least 2.7 log E. The gamma ratios of the blue, green and red recording layer units are between 0.80 and 1.2.

30 Claims, 6 Drawing Sheets

ONE-TIME-USE CAMERA PRELOADED WITH COLOR NEGATIVE FILM ELEMENT

FIELD OF THE INVENTION

The present invention relates to one-time-use cameras preloaded with color negative films intended to create images for scanning, electronic correction, and reconversion to a viewable form.

DEFINITION OF TERMS

The term "one-time-use camera" or "OTUC" is used to indicate a camera supplied to the user preloaded with a light sensitive silver halide photographic element and having a lens and shutter. The terms "single-use camera," "film-with-lens unit," "disposable camera" and the like are also employed in the art for cameras that are intended for one use, after which they are recycled, subsequent to removal of the film for development.

The term "E" is used to indicate exposure in lux-seconds.

The term "gamma" is employed to indicate the incremental increase in image density ($\Delta D$) produced by a corresponding incremental increase in log exposure ($\Delta \log E$) and indicates the maximum gamma measured over an exposure range extending between a first characteristic curve reference point lying at a density of 0.15 above minimum density and a second characteristic curve reference point separated from the first reference point by 0.9 log E.

The term "coupler" indicates a compound that reacts with oxidized color developing agent to create or modify the hue of a dye chromophore.

In referring to blue, green and red recording dye image-forming layer units, the term "layer unit" indicates the hydrophilic colloid layer or layers that contain radiation-sensitive silver halide grains to capture exposing radiation and couplers that react upon development of the grains. The grains and couplers are usually in the same layer, but can be in adjacent layers.

The term "exposure latitude" indicates the exposure range of a characteristic curve segment over which instantaneous gamma ($\Delta D/\Delta \log E$) is at least 25 percent of gamma, as defined above. The exposure latitude of a color element having multiple color recording units is the exposure range over which the characteristic curves of the red, green, and blue color recording units simultaneously fulfill the aforesaid definition.

The term "gamma ratio" when applied to a color recording layer unit refers to the ratio determined by dividing the color gamma of a cited layer unit after an imagewise color separation exposure and process that enables development of primarily that layer unit by the color gamma of the same layer unit after an imagewise white light exposure and process that enables development of all layer units. This term relates to the degree of color saturation available from that layer unit after conventional optical printing. Larger values of the gamma ratio indicate enhanced degrees of color saturation under optical printing conditions.

The term "colored masking coupler" indicates a coupler that is initially colored and that loses its initial color during development upon reaction with oxidized color developing agent.

The term "substantially free of colored masking coupler" indicates a total coating coverage of less than 0.09 millimole/$m^2$ of colored masking coupler.

The term "dye image-forming coupler" indicates a coupler that reacts with oxidized color developing agent to produce a dye image.

The term "absorption half-peak bandwidth" indicates the spectral range over which a dye exhibits an absorption equal to at least half of its peak absorption.

The term "development inhibitor releasing compound" or "DIR" indicates a compound that cleaves to release a development inhibitor during color development. As defined DIR's include couplers and other compounds that utilize anchimeric and timed releasing mechanisms.

In referring to grains and emulsions containing two or more halides, the halides are named in order of ascending concentrations.

In referring to grains, "ECD" indicates mean equivalent circular diameter and, in describing tabular grains, "t" indicates mean tabular grain thickness.

The term "average aspect ratio" when used in reference to tabular emulsion grains, refers to the ratio of mean tabular grain equivalent circular diameter to mean tabular grain thickness.

The term "aspect ratio" when used in reference to an image refers to the ratio of image length to height as recorded on an element or as provided in viewable form.

References to blue, green, and/or red spectral sensitizing dyes indicate dyes that absorb blue, green, or red light and transfer the absorbed photon energy to silver halide grains when adsorbed to their surfaces.

Research Disclosure is published by Kenneth Mason Publications, Ltd., Dudley House, 12 North St., Emsworth, Hampshire PO10 7DQ, England.

BACKGROUND OF THE INVENTION

There are a variety of one-time-use cameras that have provided amateur photographers with a low cost means of taking satisfactory pictures. Such cameras have been provided with lenses, shutters and film advance mechanisms. They are intended for one use, after which they are recycled, subsequent to removal of the film for development. While prior one-time-use cameras were satisfactory for many purposes, there remain problems with their performance. Such one-time-use cameras require a sensitive film and a short shutter time to reduce sharpness losses caused by motion of the camera during picture taking. However, high speed, high sensitivity films tend to be lower in sharpness and higher in grain than lower sensitivity films with the result that their use in such cameras leads to pictures that are inadequate for many purposes. The sharpness problem can be exacerbated by the poor quality of the lenses often employed in these one-time-use cameras. This problem is even more severe when one attempts to provide one-time use cameras that will provide negatives that are suitable for production of large prints by high magnification enlargement. Further, there is a desire in one-time-use cameras to provide more pictures from each camera. One way to do this would be to provide a smaller negative, thereby allowing the same amount of film to record more images. However, since the negatives were not satisfactory for high magnification enlargements, it was not possible to minimize the size of the negatives exposed without having a deterioration in the sharpness and graininess of the prints formed from the negative. Additionally, there would be fewer ecological concerns if more negatives could be taken on the same amount of film as there would be less generation of chemicals during development per print as well as more negatives taken per single-use camera. Further, these one-time-use cameras require a long latitude film since exposure control on the cameras is limited to non-existent and the only way of ensuring adequate picture taking ability in a variety of picture-taking situations is by designing the film to be adequately responsive to a wide variety of lighting conditions.

Color negative photographic elements are conventionally formed with superimposed blue, green and red recording layer units coated on a support. The blue, green, and red recording layer units contain radiation-sensitive silver halide emulsions that form a latent image in response to blue, green, and red light, respectively. Additionally, the blue recording layer unit contains a yellow dye image-forming coupler, the green recording layer unit contains a magenta dye image-forming coupler, and the red recording layer unit contains a cyan dye image-forming coupler. Following imagewise exposure, the photographic elements are processed in a color developer, which contains a color developing agent that is oxidized while selectively reducing latent image-bearing silver halide grains to silver. The oxidized color developing agent then reacts with the dye image-forming coupler in the vicinity of the developed grains to produce an image dye. Yellow (blue-absorbing), magenta (green-absorbing), and cyan (red-absorbing) image dyes are formed in the blue, green, and red recording layer units respectively. Subsequently the element is bleached (i.e., developed silver is converted back to silver halide) to eliminate neutral density attributable to developed silver and then fixed (i.e., silver halide is removed) to provide stability during subsequent room light handling.

When processing is conducted as noted above, negative dye images are produced. To produce a viewable positive dye image and, hence, to produce a visual approximation of the hues of the subject photographed, white light is typically passed through the color negative image to expose a second color photographic element having blue, green, and red recording layer units as described above, usually coated on a white reflective support. The second element is commonly referred to as a color print element, and the process of exposing the color print element through the image bearing color negative element is commonly referred to as optical printing. Processing of the color print element as described above produces a viewable positive image that approximates that of the subject originally photographed.

A problem with the accuracy of color reproduction delayed the commercial introduction of color negative elements. In color negative imaging two dye image-forming coupler containing elements, a camera speed image capture and storage element and an image display, i.e. print element, are sequentially exposed and processed to arrive at a viewable positive image. The dye image-forming couplers each produce dyes that only approximate an absorption profile corresponding to that recorded by the silver halide grains. Since the color negative element cascades its color errors forward to the color print element, the cumulative error in the final print is unacceptably large, absent some form of color correction.

A commercially acceptable solution that remains in use today in the form of color slides is to subject a color photographic element having blue, green and red recording layer units to reversal processing. In reversal processing the film is first black-and-white processed to develop exposed silver halide grains imagewise without formation of a corresponding dye image. Thereafter, the remaining silver halide grains are rendered developable. Color development followed by bleaching and fixing produces a viewable color image corresponding to the subject photographed. The primary objections to this approach are (a) the more complicated processing required and (b) the absence of an opportunity to correct underexposures and overexposures, as is provided during exposure of a print element.

Commercial acceptance of color negative elements occurred after commercial introduction of the first color reversal films. The commercial solution to the problem of cascaded color error has been to place colored masking couplers in the color negative element at concentrations of greater than 0.12 (and typically greater than 0.25) millimole/$m^2$. Illustrations of colored masking couplers are provided by *Research Disclosure*, Vol. 389, September 1996, Item 38957, XII. Features applicable only to color negative, paragraphs (1) and (2). The colored masking couplers lose or change their color in areas in which grain development occurs producing a dye image that is a reversal of the unwanted absorption of the image dye. This has the effect of neutralizing unwanted spectral absorption by the image dyes and thereby providing more accurate color reproduction at a subsequent printing step. It also has the effect of raising the neutral density of the processed color negative element. However, this is not a practical difficulty, since this is easily offset by increasing exposure levels when exposing the print element through the color negative element. The color masking couplers increase the gamma ratios of the color recording layer units.

In this regard, it should be noted that colored masking couplers have no applicability to reversal color elements intended for direct viewing. They actually increase visually objectionable dye absorption in a color negative film, superimposing an overall salmon colored tone, which can be tolerated only because color negative images are not intended to be viewed. On the other hand, color reversal images are made to be viewed, but not printed. Thus colored masking couplers, if incorporated in reversal films, would be visually objectionable and serve no useful purpose. Additionally, since reversal color elements are intended for direct viewing, the dyes which form the image must be employed in a visually pleasing manner. This means providing a dye image having a dye gamma of two or greater in each color record, a requirement, which when combined with the density forming ability of couplers, effectively limits the exposure latitude of such elements to less than about 2.4 log E.

In addition to incorporating colored masking couplers in color negative photographic elements, it has been recognized that improved dye images can be realized by incorporating one or more developer inhibitor releasing compounds in the dye image-forming layer units. The development inhibitor, which is unblocked and increases in mobility by release during color development, improves the dye image by interacting with adjacent layer units to create favorable interimage effects and by sharpening dye image edge definition. These favorable interimage effects involve the imagewise retardation of development rates in several color records as a function of exposure and development in any one color record. The net effect is one of reducing dye density in one color record as a function of exposure and development in another color record, thus effectively neutralizing unwanted spectral absorption by the image dyes, and thereby providing more accurate color reproduction at a subsequent printing step. Illustrations of development inhibitor releasing compounds are provided by *Research Disclosure*, Item 38957, cited above, X. Dye image formers and modifiers, C. Image dye modifiers. These DIR compounds increase the gamma ratio of the color recording units.

Selection of suitable DIR compounds based on a measured diffusion factor is illustrated by Iwasa et al U.S. Pat. No. 4,524,130. Iwasa et al addresses the problem of providing color negative photographic elements that provide improved color print enlargements having increased sharpness and reduced graininess. The problem is addressed by employing in combination radiation-sensitive silver halide emulsion layers differing in iodide content and containing DIR's having diffusion factors of 0.4 or higher. These choices in iodide content and DIR characteristics inherently provide high levels of color correction between the color records since the same diffusion mechanisms responsible for high intralayer sharpness induce high interlayer interimage effects and inherently produce color records having high gamma ratios. Iwasa et al makes no mention of adapting color negative photographic elements for producing images that are of improved quality when converted to digital form and then reconstructed for viewing.

It has thus become a near universal goal in modem silver halide color negative photography of seeking and employing high gamma ratio elements to achieve excellent color.

In color negative films in which silver coating coverages are significantly reduced, it is in some instances difficult to obtain a desired level of image discrimination (Dmax-Dmin) when masking couplers are present. The following patents include examples of color negative elements in which masking couplers have been omitted: Schmittou et al U.S. Pat. No. 5,183,727 (Element I), Sowinski et al U.S. Pat. Nos. 5,219,715 and 5,322,766 (Element III), English et al U.S. Pat. No. 5,318,880 (Sample 108), Szajewski et al U.S. Pat. No. 5,298,376 (Samples 301 to 312), and Lushington et al U.S. Pat. No. 5,300,417 (samples 300 to 310). In limiting silver coating coverages, these patents have not exhibited the degree of exposure latitude normally desired for color negative films. Further, the gamma ratios were still maintained at high levels so as to provide for the desired color properties after optical printing.

The operation of substantial levels of interlayer interimage in a typical color negative photographic element intended for optical printing is not without consequence, however. It is appreciated that chemical acutance enhancement that amplifies edge differences to increase print-through visual sharpness and interlayer interimage effects that build colorfulness in the silver halide color paper optical print also amplify the granular nature of the image areas rendered by the silver halide microcrystals as dye deposits. This image noise is termed graininess. The buildup of chemically derived image noise from chemical signal processing in color negative film presently limits the utility of high-speed photographic recording materials and lower speed materials intended for high magnification applications, such as 24 mm-frame size formats. Furthermore, high-speed films of the type desired for use in inexpensive cameras such as one-time-use cameras that lack exposure control because of its prohibitive cost generally suffer chemical performance limitations due to the properties of the very large silver halide emulsions that are required. It is not even possible to produce adequately high chemical interlayer interimage effects with them at any noise price and still retain high sensitivity. In addition, the high interlayer interimage requirements for more accurate emulsion spectral sensitivities are prohibitive in their cost to even low speed films intended for high magnification, because of image noise build-up without necessarily generating offsetting increases in film acutance performance that would counterbalance the noise increase.

It is coming to light that the digitization of processed color negative films by image scanning is an attractive process for creating electronic signals bearing trichromatic image information that are freed from many of the constraints of the optical printing system. For example, film contrast mismatches due to processing deviations that irreparably mar the resultant optical print can be adjusted and corrected to restore the image faithfulness to the original scene. But the process of scanning and adjusting image-bearing signals and writing them to an output medium, like the chemical signal processing due to interlayer interimage effects, also increases image noise. Ironically, it is required that the scanned image be blurred by a so-called low-pass filter to avoid the generation of color banding or aliasing artifacts, and then digitally resharpened to a pleasing level at the time of image printing. In the process, it is common to observe image noise well in excess of that produced by the counterpart optical print from the same color negative, albeit at higher print sharpness.

Upon further consideration, it will be appreciated that in the process of digitally preparing a viewable image from an optically printable color negative photographic recording material, the image-bearing signals recorded by the silver halide emulsions as latent image sites have, in fact, inadvertently been subjected to signal processing twice: the first chemical processing subjected the emulsion responsivities to chemical interlayer interimage effects to correct for imperfect image dye hues in the negative and silver halide color print material, and add edge sharpness, and the second electronic processing provided, following scanning and selective blurring, analogous spatially indiscriminate image amplification, color correction for imperfect image dyes, and edge sharpening. But it is uncertain that the second electronic signal processing derives any material benefit from the first chemical signal processing that preceded it. It is the object of one representative commercial electronic signal processing pathway, following scanning that produces image-bearing electronic signals from the color negative image dye deposits, to remove the chromatic interdependence of the signals by applying the precise inverse or reciprocal of the film chemical color correction matrix to them. While this procedure may adequately achieve the objective of removing the effects of chemical interlayer interimage effects on the image trichromatic densities derived from scanning, a question remains surrounding the treatment's effect on image noise. In particular, at the usual tone scale and while maintaining color fidelity and image sharpness, would the noise of a digital image be reduced if the image bearing signals were subjected to significant signal processing just once? There remains a need for low graininess color photographic recording materials that have high sensitivity to capture images in inexpensive cameras lacking exposure control such as one-time-use cameras. A need is rapidly becoming evident for low-noise image-bearing signals following scanning that allow higher levels of electronic signal processing to further raise reconstructed viewable image colorfulness and sharpness to desired levels that are prohibitive or even wholly unattainable in systems that rely solely on chemical interlayer interimage effects to produce system color correction and edge enhancement.

PROBLEM TO BE SOLVED BY THE INVENTION

In spite of this sustained effort, there remains a need for color films suitable for use in one-time-use cameras, which enable the production of viewable images having excellent color reproduction, low grain, and high sharpness following scanning and electronic conversion.

SUMMARY OF THE INVENTION

In one aspect this invention is directed to a one-time-use camera preloaded with a color negative photographic element for producing a color image suited for conversion to an electronic form and subsequent reconversion into a viewable form comprised of a support and, coated on the support, a plurality of hydrophilic colloid layers, including radiation-sensitive silver halide emulsion layers, forming layer units for separately recording blue, green, and red exposures, each of the layer units containing dye image-forming coupler chosen to produce image dye having an absorption half-peak bandwidth lying in a different spectral region in each layer unit, wherein the layer units are substantially free of colored masking coupler, the layer units each exhibit a dye image gamma of less than 1.5, the element exhibits an exposure latitude of at least 2.7 log E, where E is exposure measured in lux-seconds, and a light sensitivity of at least ISO 50, and wherein the gamma ratio for each of the blue, and red color recording units is between 0.8 and 1.2.

In another aspect, this invention is directed to a color negative photographic element suited both for preloading in a one-time-use camera and for producing a color image suited for conversion to an electronic form and subsequent reconversion into a viewable form, said element comprising a support and, coated on the support, a plurality of hydrophilic colloid layers, including radiation-sensitive silver halide emulsion layers, forming layer units for separately recording blue, green, and red exposures, each of the layer units containing dye image-forming coupler chosen to produce image dye having an absorption half-peak bandwidth lying in a different spectral region in each layer unit, WHEREIN the layer units are substantially free of colored masking coupler, the layer units each exhibit a dye image gamma of less than 1.5, the element exhibits an exposure latitude of at least 2.7 log E, where E is exposure measured in lux-seconds, and a light sensitivity of at least ISO 50, and the gamma ratio of each of the red and blue light recording layer units is between 0.80 and 1.20.

In a further embodiment, this invention is directed to a method of chemically developing an image exposed onto the described photographic element.

In yet another aspect, this invention is directed to a method of creating density representative electronic signals which may be employed to form a viewable image from a color negative photographic element suited both for pre-loading in a one-time-use camera and for producing a color image suited for conversion to an electronic form and subsequent reconversion into a viewable form comprising the steps of:

A) scanning an imagewise exposed and color developed color negative photographic element, said element comprising a support and, coated on the support, a plurality of hydrophilic colloid layers, including radiation-sensitive silver halide emulsion layers, forming layer units for separately recording blue, green, and red exposures, each of the layer units containing dye image-forming coupler chosen to produce image dye having an absorption half-peak bandwidth lying in a different spectral region in each layer unit, WHEREIN the layer units are substantially free of colored masking coupler, the layer units each exhibit a dye image gamma of less than 1.5, the element exhibits an exposure latitude of at least 2.7 log E, where E is exposure measured in lux-seconds, and a light sensitivity of at least ISO 50, and the gamma ratio of each of the red and blue light recording layer units is between 0.80 and 1.20, to form density representative electronic signals for said red, green, and blue color recording units, B) electronically manipulating said density representative electronic signals formed in step A to correct either or both interimage interactions and gamma mismatches among said color records so as to produce an electronic record of said corrected color image, and C) transmitting, storing, printing, or displaying said electronic record.

In yet another embodiment, this invention is directed to a method of electronically processing an image from a scene exposed onto a color negative photographic element suited for preloading in a one-time-use camera and for producing a color image suited for conversion to an electronic form and subsequent reconversion into a viewable form comprising the steps of sequentially:

a) converting scanner generated red, green, and blue image-bearing signals from an imagewise exposed, color developed and color scanned color negative photographic element to corresponding red, green, and blue scanner-density signals;

said element comprising a support and, coated on the support, a plurality of hydrophilic colloid layers, including radiation-sensitive silver halide emulsion layers, forming layer units for separately recording blue, green, and red exposures, each of the layer units containing dye image-forming coupler chosen to produce image dye having an absorption half-peak bandwidth lying in a different spectral region in each layer unit, WHEREIN the layer units are substantially free of colored masking coupler, the layer units each exhibit a dye image gamma of less than 1.5, the element exhibits an exposure latitude of at least 2.7 log E, where E is exposure measured in lux-seconds, and a light sensitivity of at least ISO 50, and the gamma ratio of the blue light recording layer units is between 0.80 and 1.20;

b) matrix transforming said red, green, and blue scanner-density signals to channel dependent red, green, and blue image-bearing signals, c) modifying said channel dependent red, green, and blue image-bearing signals to correct for gamma mismatches or errors using a one-dimensional look-up table to form corrected channel dependent red, green, and blue image-bearing signals d) transforming said corrected channel dependent red, green, and blue image-bearing signals to red, green, and blue output image-bearing signals using a one-dimensional look-up table; and e) transmitting, storing, printing or displaying said red, green, and blue output image-bearing signals.

ADVANTAGEOUS EFFECT OF THE INVENTION

The invention provides a film suitable for use in a single-use camera that provides excellent images after scanning and electronic conversion.

BRIEF DESCRIPTION OF THE DRAWINGS

The invention will be described with reference to the accompanying drawings, wherein.

DESCRIPTION OF PREFERRED EMBODIMENTS

Figure 1:
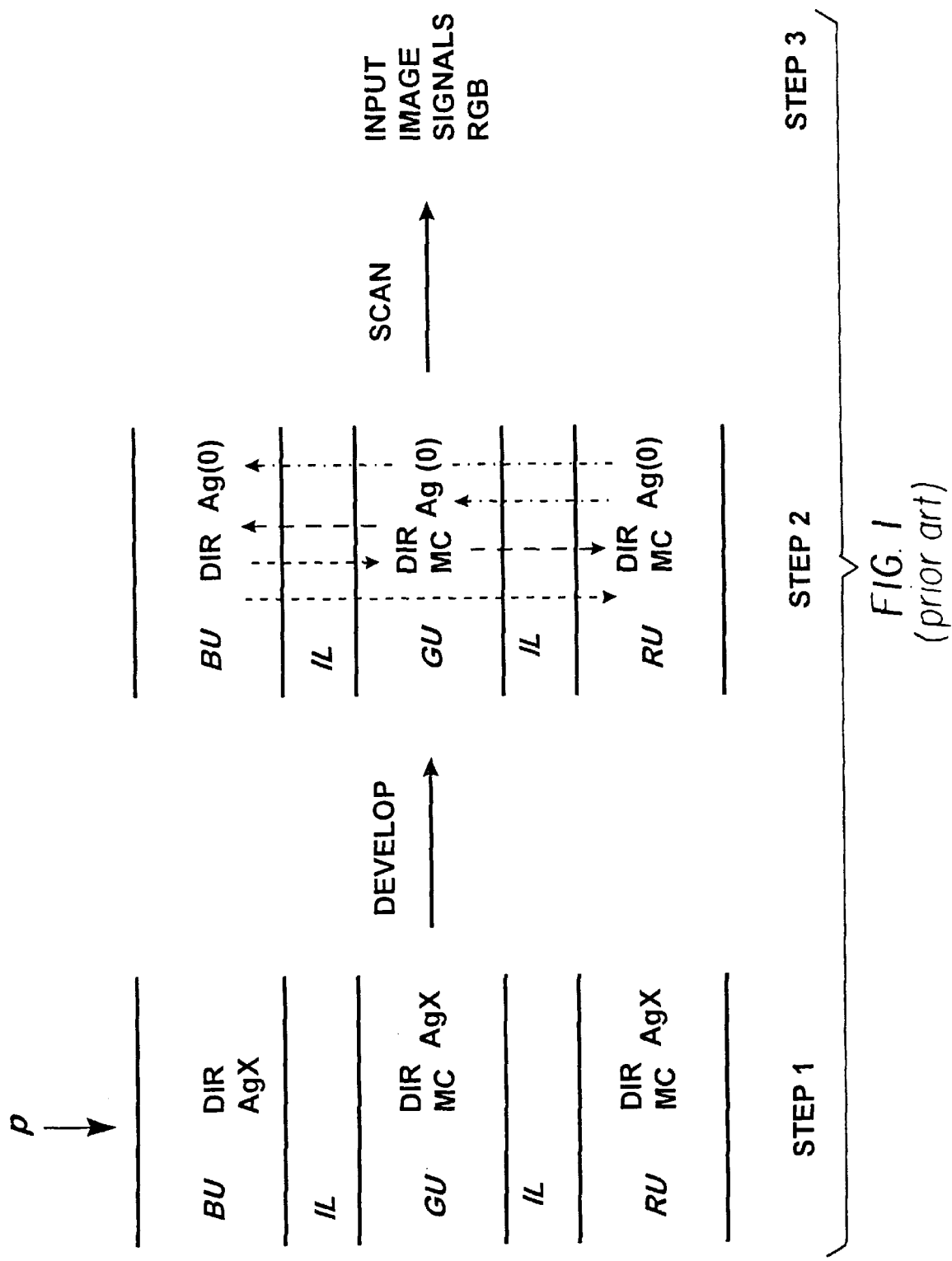
FIG. 1 shows schematically the generation of input image-bearing signals by scanning a color negative recording material of the prior art in block diagram form.

It has been discovered quite unexpectedly that a one-time-use camera preloaded with a color negative photographic element constructed as described above produces images for viewing of improved quality, where the images are obtained by scanning the exposed and processed color negative elements to obtain a manipulable electronic record of the image pattern, followed by reconversion of the adjusted electronic record to a viewable form. In particular, high print sharpness, low print grain, and excellent color reproduction are simultaneously obtained. Since the color negative photographic elements are not intended to be used for printing, colored masking couplers are not required. Further, it has been surprisingly observed that sharpness, granularity, and color reproduction in a dye image to be viewed is markedly improved when the gamma ratio for each of the blue, green, and red color recording units is less than 1.2 and greater than 0.8. The gamma ratios described are realized by limiting or excluding color masking couplers from the elements of the invention. They are also realized by proper selection of DIR compounds, by judicious balancing of emulsion halide content, and in particular by choice of emulsion iodide content. Proper selection of the quantity of emulsion to be employed in each layer is important, not only for obtaining the required gamma ratios, but also for obtaining the required exposure latitude. Another feature important for obtaining the required exposure latitude is the use of multiple layers for each color recording unit.

It is the recognition of this invention that image noise can be reduced, and image sharpness and colorfulness increased by designing layer gamma ratios to be within a narrow range while avoiding or minimizing other performance deficiencies, where the color record is placed in an electronic form prior to recreating a color image to be viewed. Whereas it is impossible to separate image noise from the remainder of the image information, either in printing or by manipulating an electronic image record, it is possible by adjusting an electronic image record that exhibits low noise, as is provided by the color negative elements of the invention, to improve overall curve shape and sharpness characteristics in a manner that is impossible to achieve by known printing techniques. Thus, images can be recreated from electronic image records derived from the color negative elements of the invention that are superior to those similarly derived from conventional color negative elements constructed to serve printing applications.

The one-time-use cameras employed in this invention can be any of those known in the art. These cameras can provide specific features as known in the art such as shutter means, film winding means, film advance means, waterproof housings, single or multiple lenses, lens selection means, variable aperture, focus or focal length lenses, means for monitoring lighting conditions, means for adjusting shutter times or lens characteristics based on lighting conditions or user provided instructions, and means for camera recording use conditions directly on the film. These features include, but are not limited to: providing simplified mechanisms for manually or automatically advancing film and resetting shutters as described at Skarman, U.S. Pat. No. 4,226,517; providing apparatus for automatic exposure control as described at Matterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools, or resilient sleeves as described at Mochida, U.S. Pat. No. 4,884,087; providing a film patrone or cartridge removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly wound spools as described at Yagi et al, European Patent Application 0,466,417 A.

While the film may be mounted in the one-time-use camera in any manner known in the art, it is especially preferred to mount the film in the one-time-use camera such that it is taken up on exposure by a thrust cartridge. Thrust cartridges are disclosed by Kataoka et al U.S. Pat. No. 5,226,613; by Zander U.S. Pat. No. 5,200,777; by Dowling et al U.S. Pat. No. 5,031,852; and by Robertson et al U.S. Pat. No. 4,834,306. Narrow bodied one-time-use cameras suitable for employing thrust cartridges in this way are described by Tobioka et al U.S. Pat. No. 5,692,221. More generally, the size limited cameras most useful as one-time-use cameras will be generally rectangular in shape and can meet the requirements of easy handling and transportability in, for example, a pocket, when the camera as described herein has a limited volume. The camera should have a total volume of less than about 450 cubic centimeters (cc's), preferably less than 380 cc, more preferably less than 300 cc, and most preferably less than 220 cc. The depth-to-height-to-length proportions of such a camera will generally be in an about 1:2:4 ratio, with a range in each of about 25% so as to provide comfortable handling and pocketability. Generally the minimum usable depth is set by the focal length of the incorporated lens and by the dimensions of the incorporated film spools and cartridge. The camera will preferably have the majority of corners and edges finished with a radius-of-curvature of between about 0.2 and 3 centimeters. The use of thrust cartridges allows a particular advantage in this invention by providing easy scanner access to particular scenes photographed on a roll while protecting the film from dust, scratches, and abrasion, all of which tend to degrade the quality of an image.

While any known taking lens may be employed in the cameras of this invention, the taking lens mounted on the single-use cameras of the invention are preferably single aspherical plastic lenses. The lenses will have a focal length between about 10 and 100 mm, and a lens aperture between f/2 and f/32. The focal length is preferably between about 15 and 60 mm and most preferably between about 20 and 40 mm. For pictorial applications, a focal length matching to within 25% the diagonal of the rectangular film exposure area is preferred. Lens apertures of between f/2.8 and f/22 are contemplated with a lens aperture of about f/4 to f/116 being preferred. The lens MTF can be as low as 0.6 or less at a spatial frequency of 20 lines per millimeter (1 pm) at the film plane, although values as high as 0.7 or most preferably 0.8 or more are contemplated. Higher lens MTF values generally allow sharper pictures to be produced. Multiple lens arrangements comprising two, three, or more component lens elements consistent with the functions described above are specifically contemplated.

The camera enables exposure of image areas on the film of less than about 10 cm$^2$. Even smaller exposure areas can be employed with values of less than 9, 8, or 7 cm$^2$ being preferred. Especially preferred are exposure areas of 5 cm$^2$ or less. These exposed areas will typically have an image aspect ratio of between 1:1 and 4:1. Classic aspect ratios of about 1.4:1 and 1.5:1 are preferred as are High Definition Television aspect ratios of about 1.8:1 and Panoramic aspect ratios of about 2.8:1. The camera provides means for exposing more than one scene per unit of film, with arrangements enabling the exposure of 6, 10, 12, 24, 27, 36 or even more distinct scenes being especially preferred. The camera can be arranged to provide the user with mixed aspect ratio scene images on the same roll.

The shutter employed with the camera allows an exposure time of less than about 1/60 second so as to minimize sharpness losses due to shake inherent with hand held cameras. Shutter times of less than 1/100 sec are preferred, while even shorter shutter times are most preferred.

Elements having excellent light sensitivity are best employed in the practice of this invention. The elements should have a sensitivity of at least about ISO 50, preferably have a sensitivity of at least about ISO 200, and more preferably have a sensitivity of at least about ISO 400. Elements having a sensitivity of up to ISO 3200 or even higher are specifically contemplated. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number PH 2.27-1981 (ISO (ASA Speed)) and relates specifically the average of exposure levels required to produce a density of 0.15 above fog in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

FIG. 1 illustrates the operation of interlayer interimage interactions schematically in a block diagram of a color photographic recording material of the prior art. The element is exposed imagewise to photons "p" of white light in step 1. The silver halide crystals, noted as "AgX", absorb the actinic energy and are rendered developable by the formation of latent image centers. The photographic element with a Blue Recording Layer Unit (BU), a Green Recording Layer Unit (GU), a Red Recording Layer Unit (RU), and interlayers (IL) is then subjected to color negative development in step 2. The silver halide crystals are in reactive association with development inhibitor releasing couplers indicated as "DIR", and colored masking couplers noted as "MC". Developer reduces exposed silver halide crystals producing metallic silver and oxidized developer, which can react with couplers to imagewise release developer inhibitor molecules and consume the masking coupler, creating an imagewise positive mask. The net effect is intralayer and interlayer imagewise suppression of density formation, represented by broken-line arrows between color recording units. Following the wet processing steps of bleaching, fixing, washing, and drying, the color negative recording material is scanned by an image scanner generating image-bearing signals R, G, and B in electronic form for each picture element of the image being scanned. These input signals are subjected to electronic processing described later. These input image-bearing signals are highly interdependent and confounded as a result of the interlayer chemical interactions in the photographic recording material shown in step 2 and, to an extent, the unwanted off-peak absorptions of the imperfect imaging dyes. It is a primary goal of current color negative film art to produce substantial imagewise interlayer interactions to render improved color reproduction after optical printing.

Figure 2:
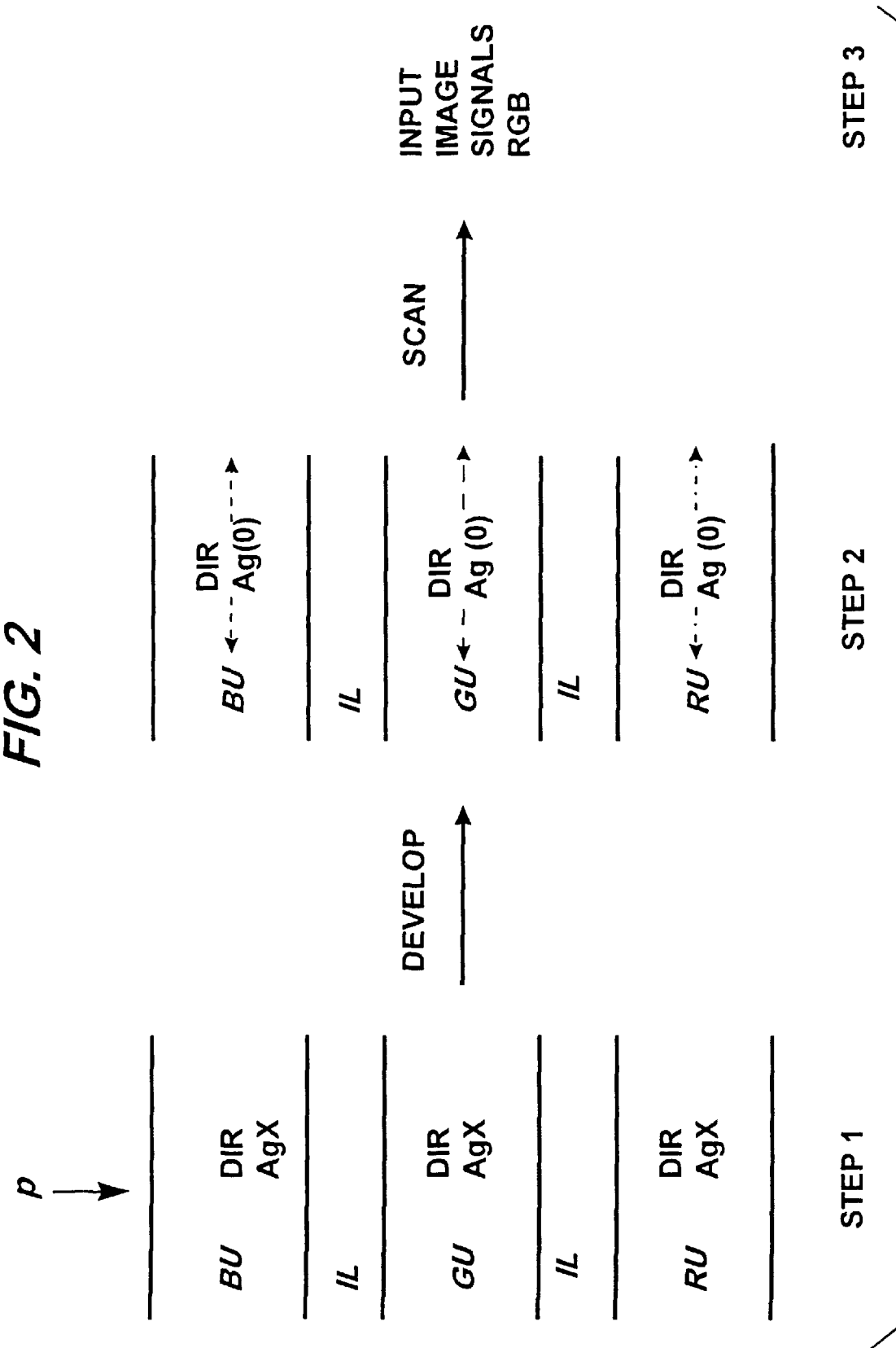
FIG. 2 shows schematically the generation of input image-bearing signals by scanning a color negative recording material in accordance with the teachings of the invention in block diagram form.

FIG. 2 illustrates the minimization of interlayer interimage interactions schematically in a block diagram of a color photographic recording material of the invention. The element is exposed imagewise to photons "p" of white light in step 1. The silver halide crystals, noted as "AgX", absorb the actinic energy and are rendered developable by the formation of latent image centers. The photographic element is then subjected to color negative development in step 2. The silver halide crystals are in reactive association with development inhibitor releasing couplers indicated as "DIR". Developer reduces exposed silver halide crystals producing metallic silver and oxidized developer, which can react with couplers to imagewise release developer inhibitor molecules. Referring to a preferred embodiment of the invention, the colored masking couplers are absent. The net effect is primarily intralayer imagewise suppression of density formation, represented by broken-line arrows constrained within color recording units. Following optional wet processing steps of bleaching, fixing, washing, and drying, the color negative recording material is scanned by an image scanner generating image-bearing signals R, G, and B in electronic form for each picture element of the image being scanned. These input signals are subjected to electronic processing described later. These input image-bearing signals are substantially independent and unconfounded as a result of the low interlayer chemical and density interactions in the photographic recording material shown in step 2. It is an object of the invention to employ a means of electronic signal processing of substantially independent image-bearing signals of color negative films of the invention to render improved color reproduction when said signals are reconverted to viewable form.

Figure 3:
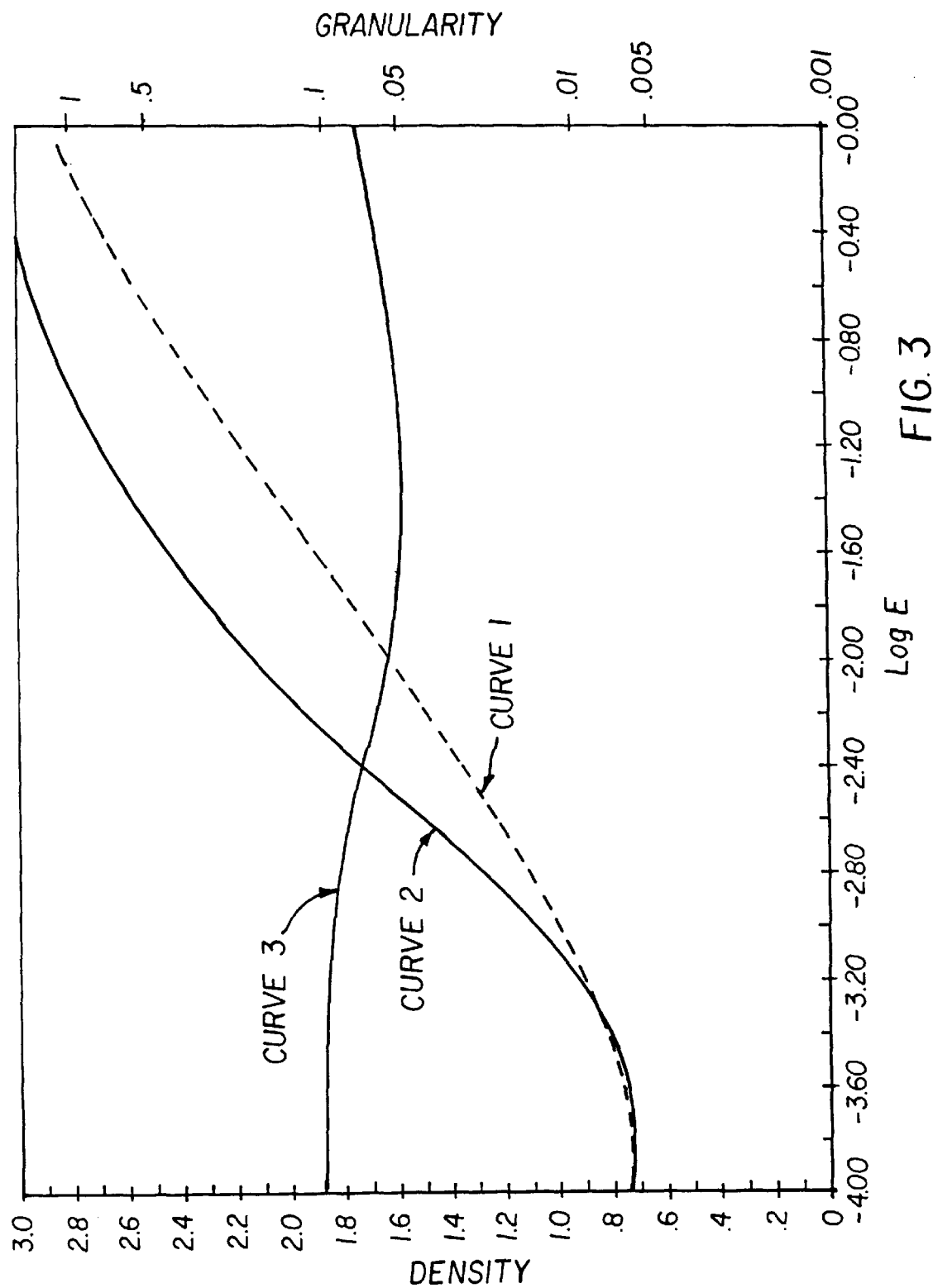
FIG. 3 illustrates the interdependent density responses of color recording units of color negative recording material of the prior art.

In FIG. 3, the interdependent nature of the image-bearing signals that result from scanning the color negative element of FIG. 1 is explained by the characteristic curves plotting image dye density vs. the logarithm to base 10 of exposure. Curve 1 is the Status M green density response following white light exposure and processing of a color negative photographic recording material of the current art. Curve 2 is its Status M green density response following a green light separation exposure. The gamma of curve 2 is sharply increased in the lowest exposure regions, and the useful recording range of the element to green light is seen to be truncated at higher exposures, relative to the recording latitude available from white light exposures. The imagewise suppression of the formation of image dyes responsible for the high gamma and densities of curve 2 by the development effects of the other color recording units following a white light exposure and processing in curve 1 is a manifestation of chemical interlayer interimage effects working on the green light sensitive recording unit. The gamma ratio of the element of FIG. 1 is determined by dividing the gamma of curve 2 by the gamma of curve 1 shown in FIG. 3. Curve 3 shows the Status M blue density response of the blue light sensitive recording unit following a non-imagewise blue light exposure and an imagewise stepped green light exposure, such as in curve 2. An imagewise reduction in blue density yielding a positive characteristic curve is produced by interlayer interimage effects derived from the imagewise exposure and development of the green recording unit. The image-bearing input signals derived from scanning the dye images of the element of the art whose response is depicted in FIG. 3 are seen to be highly confounded and interdependent on the magnitude of each other.

Figure 4:
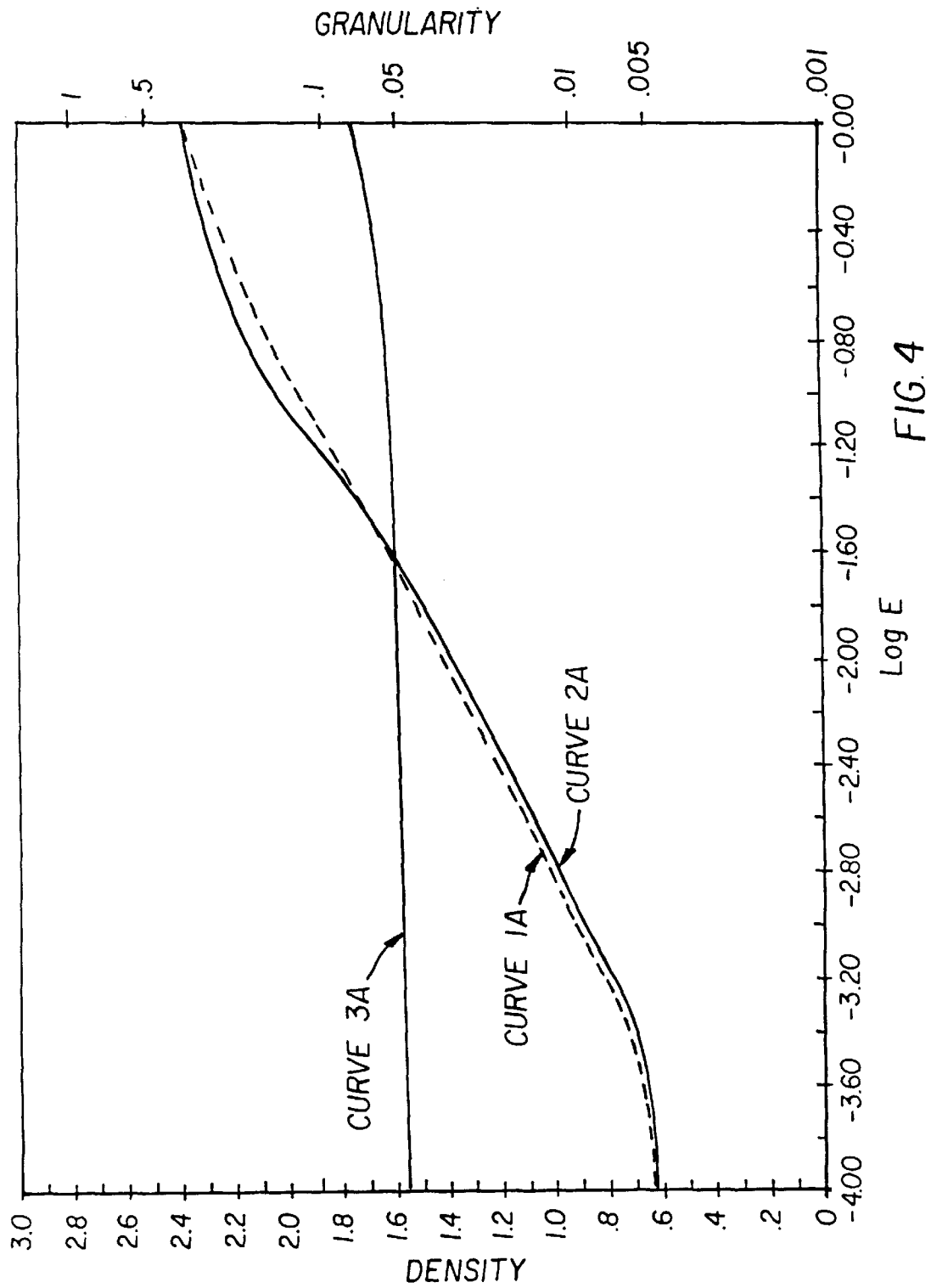
FIG. 4 illustrates the substantially independent density responses of color recording units of color negative recording material in accordance with the invention.

In FIG. 4, the substantially independent nature of the image-bearing signals that result from scanning the color negative element of FIG. 2 in one embodiment of the invention is explained by the characteristic curves plotting image dye density vs. the logarithm to base 10 of exposure. Curve 1A is the Status M green density response following white light exposure and processing of a color negative photographic recording material of the invention. Curve 2A is its Status M green density response following a green light separation exposure. The gamma of curve 2A is about equal to the gamma of curve 1A in the lowest exposure regions, and the useful recording range of the element to green light is seen to be large and comparable to the recording latitude available from white light exposures. The gamma ratio of the element of FIG. 4 is determined by dividing the gamma of curve 2A by the gamma of curve 1A shown in FIG. 4. The absence of imagewise suppression of the formation of image dyes of curve 2A by the development effects of the other color recording units following a white light exposure and processing as in curve 1A is one example of minimized interlayer interimage effects resulting in a preferred gamma ratio of the invention. Curve 3A shows the Status M blue density response of the blue light sensitive recording unit following a non-imagewise blue light exposure and an imagewise stepped green light exposure, such as in curve 2A. An essentially invariant blue density response results to imagewise development of the green light recording unit of the inventive element of FIG. 2 whose green light imagewise response is portrayed by curve 2A of FIG. 4. The image-bearing input signals derived from scanning the dye images of the element according to the invention whose response is depicted in FIG. 4 are seen to be substantially independent of the magnitude of each other.

The excellent imaging characteristics of the described element are obtained when the gamma ratio for each of the red and blue color recording units is less than 1.2. In a preferred embodiment, the red, green, and blue light sensitive color forming units each exhibit gamma ratios of less than 1.2. In a more preferred embodiment, the red, green, and blue light sensitive color forming units each exhibit gamma ratios of less than 1.15. In an even more preferred embodiment, the red and blue light sensitive color forming units each exhibit gamma ratios of less than 1.10. In a most preferred embodiment, the red, green, and blue light sensitive color forming units each exhibit gamma ratios of less than 1.10. In all cases, it is preferred that the individual color unit(s) exhibit gamma ratios of less than 1.15, more preferred that they exhibit gamma ratios of less than 1.10 and even more preferred that they exhibit gamma ratios of less than 1.05. The gamma ratios of the layer units need not be equal. These low values of the gamma ratio are indicative of low levels of interlayer interaction, also known as interlayer interimage effects, between the layer units and are believed to account for the improved quality of the images after scanning and electronic manipulation. The apparently deleterious image characteristics that result from chemical interactions between the layer units need not be electronically suppressed during the image manipulation activity. The interactions are often difficult if not impossible to suppress properly using known electronic image manipulation schemes.

Additionally, the color purity of the layer units should be maintained. Practically, this is achieved when the gamma ratios of the red, green, and blue color units are each greater than 0.80, preferably greater than 0.85, more preferably greater than 0.90, and most preferably greater than 0.95 so as to provide for adequate color separation during the overall image forming process. The minimum gamma ratio can be adjusted by selection of image couplers to be employed such that the unwanted absorptions of the dyes formed from such couplers during a development process are minimized. Many of the dye forming couplers originally employed in color photography are incapable of achieving this level of gamma ratio since their dye absorptances are excessively broad. Likewise, selection of the specific color developing agent can be a factor in adjusting the minimum gamma ratio. Non-imagewise formation of dyes during the development process should also be limited or eliminated as, for example, by inclusion of interlayers having adequate quantities of oxidized developer scavengers and by the minimization of solution physical development. Further, adequate removal of non-imagewise densities as from retained silver or dyes from the element during processing enhances the color purity of the layer units.

The gamma ratios described are realized by limiting or excluding color masking couplers from the elements of the invention. They are also realized by proper selection of DIR compounds. It is recognized that the gamma ratios may also be attained in other ways. In one concrete example, judicious choice and balancing of light sensitive emulsion halide content, may be employed to minimize the gamma ratio by minimizing the interaction of individual color records during development. Emulsion iodide content may be particularly critical in this role. Selection of the quantity of emulsion to be employed in each light sensitive layer and the sensitization conditions employed may also be critical. Further, the use of so-called barrier layers which retard the flow of development inhibitors or of development by-products, such as halide ion, between layers so as to chemically isolate individual color recording units during development may also enable one to achieve this condition. In another concrete example, fine grained non-light sensitive silver halide or silver particles may be employed to isolate color recording layers. In yet another concrete example, polymer containing layers, including those described by Pearce et al in U.S. Pat. No. 5,254,441, the disclosures of which are incorporated by reference, may also be employed to isolate color recording layers. In a further concrete example, couplers and addenda which decrease chemical interactions between color layers may be advantageously employed. These materials include the ballasted mercaptotetrazole and derivative releasing couplers such as are described by Singer et al in U.S. patent application Ser. No. 09/015,197 filed Jan. 29, 1998, the disclosure of which is incorporated by reference.

A typical color negative film construction useful in the practice of the invention is illustrated by the following:

| Element SCN-1 | |
|---|---|
| SOC | Surface Overcoat |
| BU | Blue Recording Layer Unit |
| IL1 | First Interlayer |
| GU | Green Recording Layer Unit |
| IL2 | Second Interlayer |
| RU | Red Recording Layer Unit |
| AHU | Antihalation Layer Unit |
| S | Support |
| SOC | Surface Overcoat |

The support S can be either reflective or transparent, which is usually preferred. When reflective, the support is white and can take the form of any conventional support currently employed in color print elements. When the support is transparent, it can be colorless or tinted and can take the form of any conventional support currently employed in color negative elements, e.g., a colorless or tinted transparent film support. Details of support construction are well understood in the art. In a preferred embodiment, the support strength, flexibility, and thickness are chosen to enable use in spool or cartridge form in a compact one-time-use camera. The support is thin enough to enable loading of long lengths in rolled form, while maintaining sufficient strength to resist deformation and tearing during use. The support is generally up to about 180 $\mu$m thick, preferably between 50 and 130 $\mu$m thick, and most preferably between 60 and 110 $\mu$m thick. The support and element flexibility will be such that the element can assume a radius of curvature of less than 12,000 $\mu$m, and preferably less than 6,500 $\mu$m, or even less. Elements useful without cracking or other physical deformity at a radius of curvature of 1,400 $\mu$m or even lower are contemplated. When the element useful in this invention is supplied in spool form, it may be wrapped about a core and enclosed in a removable housing with an exposed film leader as known in the art. When the element is supplied in cartridge form, the cartridge may enclose a light sensitive photographic element in roll form and a housing for protecting the film element from exposure and an opening for withdrawing the element from the cartridge receptacle. Transparent and reflective support constructions, including subbing layers to enhance adhesion, are disclosed in *Research Disclosure*, Item 38957, cited above, XV. Supports.

Each of blue, green, and red recording layer units BU, GU and RU are formed of one or more hydrophilic colloid layers and contain at least one radiation-sensitive silver halide emulsion and coupler, including at least one dye image-forming coupler. In the simplest contemplated construction each of the layer units consists of a single hydrophilic colloid layer containing emulsion and coupler. When the coupler present in a layer unit is coated in a hydrophilic colloid layer other than an emulsion containing layer, the coupler containing hydrophilic colloid layer is positioned to receive oxidized color developing agent from the emulsion during development. Usually the coupler containing layer is the next adjacent hydrophilic colloid layer to the emulsion containing layer.

In order to ensure excellent image sharpness, and to facilitate manufacture and use in cameras, all of the sensitized layers are preferably positioned on a common face of the support. When in spool form, the element will be spooled such that when unspooled in a camera, exposing light strikes all of the sensitized layers before striking the face of the support carrying these layers. Further, to ensure excellent sharpness of images exposed onto the element, the total thickness of the layer units above the support should be controlled. Generally, the total thickness of the sensitized layers, interlayers and protective layers on the exposure face of the support are less than 35 $\mu$m. It is preferred that the total layer thickness be less than 28 $\mu$m, more preferred that the total layer thickness be less than 22 $\mu$m, and most preferred that the total layer thickness be less than 17 $\mu$m. This constraint on total layer thickness is enabled by controlling the total quantity light sensitive silver halide as described below, and by controlling the total quantity of vehicle and other components, such as couplers, solvent, and such in the layers. The total quantity of vehicle is generally less than 20 g/m$^2$, preferably less than 14 g/m$^2$, and more preferably less than 10 g/m$^2$. Generally, at least 3 g/m$^2$ of vehicle, and preferably at least 5 g/m$^2$ of vehicle is present so as to ensure adhesion of the layers to the support during processing and proper isolation of the layer components. Likewise, the total quantity of other components is generally less than 12 g/m$^2$, preferably less than 8 g/m$^2$, and more preferably less than 5 g/m$^2$.

The emulsion in BU is capable of forming a latent image when exposed to blue light. When the emulsion contains high bromide silver halide grains and particularly when minor (0.5 to 20, preferably 1 to 10, mole percent, based on silver) amounts of iodide are also present in the radiation-sensitive grains, the native sensitivity of the grains can be relied upon for absorption of blue light. Preferably the emulsion is spectrally sensitized with one or more blue spectral sensitizing dyes. The emulsions in GU and RU are spectrally sensitized with green and red spectral sensitizing dyes, respectively, in all instances, since silver halide emulsions have no native sensitivity to green and/or red (minus blue) light.

Any convenient selection from among conventional radiation-sensitive silver halide emulsions can be incorporated within the layer units. Most commonly high bromide emulsions containing a minor amount of iodide are employed. To realize higher rates of processing high chloride emulsions can be employed. Radiation-sensitive silver chloride, silver bromide, silver iodobromide, silver iodochloride, silver chlorobromide, silver bromochloride, silver iodochlorobromide, and silver iodobromochloride grains are all contemplated. The grains can be either regular or irregular (e.g., tabular). Tabular grain emulsions, those in which tabular grains account for at least 50 (preferably at least 70 and optimally at least 90) percent of total grain projected area are particularly advantageous for increasing speed in relation to granularity. To be considered tabular a grain requires two major parallel faces with a ratio of its equivalent circular diameter (ECD) to its thickness of at least 2. Specifically preferred tabular grain emulsions are those having a tabular grain average aspect ratio of at least 4 and, optimally, greater than 8. Preferred mean tabular grain thicknesses are less than 0.3 $\mu$m (most preferably less than 0.2 $\mu$m). Ultrathin tabular grain emulsions, those with mean tabular grain thicknesses of less than 0.07 $\mu$m, are specifically preferred. The grains preferably form surface latent images so that they produce negative images when processed in a surface developer. While any usefull quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements. These lower quantities of silver are additionally important in that they enable rapid development and desilvering of the elements. Conversely, a silver coating coverage of at least 2 g of coated silver per m$^2$ of support surface area in the element is necessary to realize an exposure latitude of at least 2.7 log E while maintaining an adequately low graininess position for pictures intended to be enlarged. The green light recording layer unit is preferred to have a coated silver coverage of at least 0.8 g/m$^2$. It is more preferred that the red and green units together have at least 1.7 g/m$^2$ of coated silver and even more preferred that each of the red, green, and blue color units has at least 0.8 g/m$^2$ of coated silver. Because of its less favored location for processing, it is generally preferred that the layer unit located, on average, closest to the support contain a silver coating coverage of at least 1.0 g/m$^2$ of coated silver. Typically, this is the red recording layer unit. For many photographic applications, optimum silver coverages are at least 0.9 g/m$^2$ in the blue recording layer unit and at least 1.5 g/m$^2$ in the green and red recording layer units.

Illustrations of conventional radiation-sensitive silver halide emulsions are provided by *Research Disclosure*, Item 38957, cited above, Section I. Emulsion grains and their preparation. Chemical sensitization of the emulsions, which can take any conventional form, is illustrated in Section IV. Chemical sensitization. Spectral sensitization and sensitizing dyes, which can take any conventional form, are illustrated by Section V. Spectral sensitization and desensitization. The emulsion layers also typically include one or more antifoggants or stabilizers, which can take any conventional form, as illustrated by Section VII. Antifoggants and stabilizers.

BU contains at least one yellow dye image-forming coupler, GU contains at least one magenta dye image-forming coupler, and RU contains at least one cyan dye image-forming coupler. Any convenient combination of conventional dye image-forming couplers can be employed. Magenta dye-forming pyrazoloazole couplers are particularly contemplated. Conventional dye image-forming couplers are illustrated by *Research Disclosure*, Item 38957, cited above, X. Dye image formers and modifiers, B. Image-dye-forming couplers.

Contrary to conventional color negative film constructions, RU, GU, and BU are each substantially free of colored masking coupler. Preferably, the layer units each contain less than 0.05, more preferably less than 0.02, and most preferably less than 0.01 millimole/m$^2$ of colored masking coupler. No colored masking coupler is required in the color negative elements of this invention.

Development inhibitor releasing compound can be incorporated in at least one and, preferably, each of the layer units. DIR's are commonly employed to tailor dye image characteristic curve shapes. The DIR's contemplated for incorporation the color negative elements of the invention can release development inhibitor moieties directly or through intermediate linking or timing groups. The DIR's are contemplated to include those that employ anchimeric releasing mechanisms. Illustrations of development inhibitor releasing couplers and other compounds useful in the color negative elements of this invention are provided by *Research Disclosure*, Item 38957, cited above, X. Dye image formers and modifiers, C. Image dye modifiers, particularly paragraphs (4) to (11).

The remaining elements SOC, IL1, IL2, and AHU of the element SCN-1 are optional and can take any convenient conventional form.

The interlayers IL1 and IL2 are hydrophilic colloid layers having as their primary function color contamination reduction, i.e., prevention of oxidized developing agent from migrating to an adjacent recording layer unit before reacting with dye-forming coupler. The interlayers are in part effective simply by increasing the diffusion path length that oxidized developing agent must travel. To increase the effectiveness of the interlayers to intercept oxidized developing agent, it is conventional practice to incorporate an oxidized developing agent scavenger. When one or more silver halide emulsions in GU and RU are high bromide emulsions and, hence, have significant native sensitivity to blue light, it is preferred to incorporate a yellow filter, such as Carey Lea silver or a yellow processing solution decolorizable dye, in IL1. Suitable yellow filter dyes can be selected from among those illustrated by *Research Disclosure*, Item 38957, VIII. Absorbing and scattering materials, B. Absorbing materials. Antistain agents (oxidized developing agent scavengers) can be selected from among those disclosed by *Research Disclosure*, Item 38957, X. Dye image formers and modifiers, D. Hue modifiers/stabilization, paragraph (2).

The antihalation layer unit AHU typically contains a processing solution removable or decolorizable light absorbing material, such as one or a combination of pigments and dyes. Suitable materials can be selected from among those disclosed in *Research Disclosure*, Item 38957, VIII. Absorbing materials. A common alternative location for AHU is between the support S and the recording layer unit coated nearest the support.

The surface overcoats SOC are hydrophilic colloid layers that are provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research Disclosure*, Item 38957, IX. Coating physical property modifying addenda. The SOC overlying the emulsion layers additionally preferably contains an ultraviolet absorber, such as illustrated by *Research Disclosure*, Item 38957, VI. UV dyes/optical brighteners/luminescent dyes, paragraph (1).

Instead of the layer unit sequence of element SCN-1, alternative layer units sequences can be employed and are particularly attractive for some emulsion choices. Using high chloride emulsions and/or thin (<0.2 μm mean grain thickness) tabular grain emulsions, all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers.

It is preferred to coat one, two, or three separate emulsion layers within a single dye image forming layer unit so as to obtain the requisite exposure latitude. When two or more emulsion layers are coated in a single layer unit, they are typically chosen to differ in sensitivity. When a more sensitive emulsion is coated over a less sensitive emulsion, a higher speed and longer latitude is realized than when the two emulsions are blended. When a less sensitive emulsion is coated over a more sensitive emulsion, a higher contrast is realized than when the two emulsions are blended. Triple coating, incorporating three separate emulsion layers within a layer unit, is a technique for facilitating extended exposure latitude, as illustrated by Chang et al U.S. Pat. Nos. 5,314,793 and 5,360,703.

When a layer unit is comprised of two or more emulsion layers, the units can be divided into sub-units, each containing emulsion and coupler, that are interleaved with sub-units of one or both other layer units. The following elements are illustrative:

| Element SCN-2 | |
|---|---|
| SOC | Surface Overcoat |
| BU | Blue Recording Layer Unit |
| ILI | First Interlayer |
| FGU | Fast Green Recording Layer Sub-Unit |
| IL2 | Second Interlayer |
| FRU | Fast Red Recording Layer Sub-Unit |
| IL3 | Third Interlayer |
| SGU | Slow Green Recording Layer Sub-Unit |
| IL4 | Fourth Interlayer |
| SRU | Slow Red Recording Layer Sub-Unit |
| S | Support |
| AHU | Antihalation Layer Unit |
| SOC | Surface Overcoat |

Except for the division of the green recording layer unit into fast and slow sub-units FGU and SGU and the red recording layer unit into fast and slow sub-units FRU and SRU, the constructions and construction alternatives are essentially similar to those previously described from element SCN-1. The placement of AHU relative to S and the sensitized layers can vary depending on the decolorizing characteristics of the density forming components incorporated in AHU and on the intended use of the element, all as known in the art. Elements employing multiple AHU layers positioned on both faces of S are specifically contemplated.

| Element SCN-3 | |
|---|---|
| SOC | Surface Overcoat |
| FBU | Fast Blue Recording Layer Unit |
| IL1 | First Interlayer |
| FGU | Fast Green Recording Layer Sub-Unit |
| IL2 | Second Interlayer |
| FRU | Fast Red Recording Layer Sub-Unit |
| IL3 | Third Interlayer |
| MBU | Mid Blue Recording Layer Unit |
| IL4 | Fourth Interlayer |
| MGU | Mid Green Recording Layer Sub-Unit |
| IL5 | Fifth Interlayer |
| MRU | Mid Red Recording Layer Sub-Unit |
| IL6 | Sixth Interlayer |
| SBU | Slow Blue Recording Layer Sub-Unit |
| IL7 | Seventh Interlayer |
| SGU | Slow Green Recording Layer Sub-Unit |
| IL8 | Eighth Interlayer |

-continued

| Element SCN-3 | |
|---|---|
| SRU | Slow Red Recording Layer Sub-Unit |
| AHU | Antihalation Layer Unit |
| S | Support |
| SOC | Surface Overcoat |

Except for the division of the blue, green, and recording layer units into fast, mid, and slow sub-units, the constructions and construction alternatives are essentially similar to those previously described from element SCN-1.

When the emulsion layers within a dye image-forming layer unit differ in speed, it is conventional practice to limit the incorporation of dye image-forming coupler in the layer of highest speed to less than a stoichiometric amount, based on silver. The function of the highest speed emulsion layer is to create the portion of the characteristic curve just above the minimum density, i.e., in an exposure region that is below the threshold sensitivity of the remaining emulsion layer or layers in the layer unit. In this way, adding the increased granularity of the highest sensitivity speed emulsion layer to the dye image record produced is minimized without sacrificing imaging speed. Other details of film and camera characteristics that are especially useful in the present invention are described by Nozawa at U.S. Pat. No. 5,422,231 and by Sowinski et al at U.S. Pat. No. 5,466,560.

In the foregoing discussion the blue, green, and red recording layer units are described as containing yellow, magenta, and cyan image dye-forming couplers, respectively, as is conventional practice in color negative elements used for printing. In the color negative elements of the invention, which are intended for scanning to produce three separate electronic color records, the actual hue of the image dye produced is of no importance. What is essential is merely that the dye image produced in each of the layer units be differentiable from that produced by each of the remaining layer units. To provide this capability of differentiation, it is contemplated that each of the layer units contains one or more dye image-forming couplers chosen to produce image dye having an absorption half-peak bandwidth lying in a different spectral region. It is immaterial whether the blue, green, or red recording layer unit forms a yellow, magenta, or cyan dye having an absorption half peak bandwidth in the blue, green, or red region of the spectrum, as is conventional in a color negative element intended for use in printing, or an absorption half peak bandwidth in any other convenient region of the spectrum, ranging from the near ultraviolet (300–400 nm) through the visible and through the near infrared (700–1200 nm), so long as the absorption half peak bandwidths of the image dye in the layer units extend non-coextensive wavelength ranges. Preferably each image dye exhibits an absorption half-peak bandwidth that extends over at least a 25 (most preferably 50) nm spectral region that is not occupied by an absorption half-peak bandwidth of another image dye. Ideally the image dyes exhibit absorption half-peak bandwidths that are mutually exclusive.

When a layer unit contains two or more emulsion layers differing in speed, it is possible to lower image granularity in the image to be viewed, recreated from an electronic record, by forming in each emulsion layer of the layer unit a dye image which exhibits an absorption half peak bandwidth that lies in a different spectral region than the dye images of the other emulsion layers of the layer unit. This technique is particularly well suited to elements in which the layer units are divided into sub-units that differ in speed.

This allows multiple electronic records to be created for each layer unit, corresponding to the differing dye images formed by the emulsion layers of the same spectral sensitivity. The digital record formed by scanning the dye image formed by an emulsion layer of the highest speed is used to recreate the portion of the dye image to be viewed lying just above minimum density. At higher exposure levels second and, optionally, third electronic records can be formed by scanning spectrally differentiated dye images formed by the remaining emulsion layer or layers. These digital records contain less noise (lower granularity) and can be used in recreating the image to be viewed over exposure ranges above the threshold exposure level of the slower emulsion layers. This technique for lowering granularity is disclosed in greater detail by Sutton U.S. Pat. Nos. 5,314,794 and 5,389,506.

Each layer unit of the color negative elements of the invention produces a dye image characteristic curve gamma of less than 1.5, which facilitates obtaining an exposure latitude of at least 2.7 log E. A minimum acceptable exposure latitude of a multicolor photographic element is that which allows accurately recording the most extreme whites (e.g., a bride's wedding gown) and the most extreme blacks (e.g., a bridegroom's tuxedo) that are likely to arise in photographic use. An exposure latitude of 2.6 log E can just accommodate the typical bride and groom wedding scene. Accordingly, the elements useful in the practice of this invention exhibit an exposure latitude of at least 2.7 log E. An exposure latitude of at least 3.0 log E is preferred, since this allows for a comfortable margin of error in exposure level selection by a photographer. Even larger exposure latitudes of 3.6 log E are especially preferred for elements preloaded in one-time-use cameras, since the ability to obtain accurate image reproduction with rudimentary exposure control is realized. Whereas in color negative elements intended for printing, the visual attractiveness of the printed scene is often lost when gamma is exceptionally low, when color negative elements are scanned to create electronic image-bearing signals from the dye image records, contrast can be increased by adjustment of the electronic signal information. When the elements of the invention are scanned using a reflected beam, the beam travels through the layer units twice. This effectively doubles gamma ($\Delta D/\Delta \log E$) by doubling changes in density ($\Delta D$). Thus, gammas as low as 0.5 or even 0.2 or lower are contemplated and exposure latitudes of up to about 5.0 log E or higher are feasible.

It is appreciated that while the invention has been described in detail as a color negative element, similar considerations apply to positive working elements so long as they fulfill the latitude, gamma, masking coupler, and gamma ratio requirements already described. In a concrete example, the element can be made positive working by employing direct reversal emulsions as known in the art in combination with a color developing solution. It is further appreciated that known color reversal elements fail the latitude, gamma, and gamma ratio requirements set out herein since these requirements are physically incompatible with the image gammas required for direct viewing and with the concomitant latitudes available from dye images.

It is further appreciated that similar considerations apply to photothermographic elements, and in particular, to camera speed photothermographic elements as known in the art. Specific example of multicolor photothermographic elements are described by Levy at al, U.S. patent application Ser. No. 08/740,110, filed Oct. 28, 1996, corresponding to issued U.S. Pat. No. 5,840,475 and by Ishikawa et al in European Patent Application EP 0,762,201 A1, corresponding to issued U.S. Pat. Nos. 5,756,269 and 5,858,629 the disclosures of which are herein incorporated by reference.

The elements of the invention are typically exposed to suitable radiation to form a latent image and then processed to form a visible dye image. Processing includes the step of color development in the presence of a color developing agent to reduce developable silver halide and to oxidize the color developing agent. Oxidized color developing agent in turn reacts with a color-forming coupler to yield a dye.

The films described herein are color developed using a color developer solution having a pH of from about 9 to about 12, preferably from about 9.5 to about 11.0. The color developer solution pH can be adjusted with acid or base to the desired level, and the pH can be maintained using any suitable buffer having the appropriate acid dissociation constant. Practical examples include carbonates, phosphates, borates, tetraborates, glycine salts, leucine salts, valine salts, proline salts, alanine salts, aminobutyric acid salts, lysine salts, guanine salts and hydroxybenzoates or any other buffer known in the art to be useful for this purpose.

The color developer also includes one or more suitable color developing agents, in an amount of from about 0.01 to about 0.1 mol/l, and preferably at from about 0.02 to about 0.06 mol/l. Any suitable color developing agent can be used, many of which are known in the art, including those described in *Research Disclosure*, noted above. Particularly useful color developing agents include but are not limited to, aminophenols, p-phenylenediamines (especially N,N-dialkyl-p-phenylenediamines) and others that are well known in the art, such as EP-A 0 434 097 A1 (published Jun. 26, 1991) and EP-A 0 530 921 A1 (published Mar. 10, 1993). It may be useful for the color developing agents to have one or more water-solubilizing groups.

Bromide ion may be included in the color developer in an amount of from about 0.003 to about 0.1 mol/l, and preferably from about 0.004 to about 0.05 mol/l. Bromide ion can be provided in any suitable salt such as sodium bromide, lithium bromide, potassium bromide, ammonium bromide, magnesium bromide, or calcium bromide.

In addition to the color developing agent, bromide salts and buffers, the color developer can contain any of the other components commonly found in such solutions, including but not limited to, chloride salts, iodide salts, preservatives (also known as antioxidants), metal chelating agents (also known as metal sequestering agents), antifoggants, optical brighteners, wetting agents, stain reducing agents, surfactants, defoaming agents, auxiliary developers (such as those commonly used in black-and-white development), development accelerators, and water-soluble polymers (such as a sulfonated polystyrene).

Useful preservatives include, but are not limited to, hydroxylamines, hydroxylamine derivatives, hydroxamic acid, hydraines, hydrazides, phenols, hydroxyketones, aminoketones, saccharides, sulfites, bisulfites, salicylic acids, alkanolamines, α-amino acids, polyethyleneimines, and polyhydroxy compounds. Mixtures of preservatives can be used if desired. Hydroxylamine or hydroxylamine derivatives are preferred.

Antioxidants particularly useful in the practice are represented by the formula:

wherein L and L' are independently substituted or unsubstituted alkylene of 1 to 8 carbon atoms (such as methylene, ethylene, n-propylene, isopropylene, n-butylene, 1,1-dimethylethylene, n-hexylene, n-octylene, and sec-butylene), or substituted or unsubstituted alkylenephenylene of 1 to 3 carbon atoms in the alkylene portion (such as benzylene, dimethylenephenylene, and isopropylenephenylene).

The organic antioxidant described herein is included in the color developer composition useful in this invention in an amount of at least about 0.001 mol/l, and in a preferred amount of from about 0.001 to about 0.5 mol/l. A most preferred amount is from about 0.005 to about 0.5 mol/l. More than one organic antioxidant can be used in the same color developer composition if desired, but preferably only one is used.

Optionally but preferably, partial or total removal of silver and/or silver halide is accomplished after color development using conventional bleaching and fixing solutions (i.e., partial or complete desilvering steps), or fixing only to yield both a dye and silver image. Alternatively, all of the silver and silver halide can be left in the color developed element. One or more conventional washing, rinsing, or stabilizing steps can also be used as is known in the art. These steps are typically carried out before scanning and digital manipulation of the density representative signals.

Development is carried out by contacting the element for up to about 240 seconds, preferably for up to about 200 seconds, more preferably for up to about 90 seconds, at a temperature above about 30° C., and generally at from about 35 to about 65° C., and preferably at from about 38 to about 50° C. with a color developing solution in suitable processing equipment, to produce the desired developed image.

The overall processing time (from development to final rinse or wash) can be from about 45 seconds to about 20 minutes. Shorter overall processing times, that is, less than about 8 minutes, are desired for processing photographic color negative films according to this invention.

Processing according to the present invention can be carried out using conventional deep tanks holding processing solutions or automatic processing machines. Alternatively, it can be carried out using what is known in the art as "low volume thin tank" processing systems, or LVTT, which have either a rack and tank or automatic tray design. Such processing methods and equipment are described, for example, by Carli et al in U.S. Pat. No. 5,436,118 and publications noted therein.

Processing of the films can also be carried out using the method and apparatus designed for processing a film in a cartridge, as described, for example, by Pagano et al in U.S. Pat. No. 5,543,882.

Once yellow, magenta, and cyan dye image records have been formed in the processed photographic elements of the invention, conventional techniques can be employed for retrieving the image information for each color record and manipulating the record for subsequent creation of a color balanced viewable image. For example, it is possible to scan the photographic element successively within the blue, green, and red regions of the spectrum or to incorporate blue, green, and red light within a single scanning beam that is divided and passed through blue, green, and red filters to form separate scanning beams for each color record. A simple technique is to scan the photographic element point-by-point along a series of laterally offset parallel scan paths. The intensity of light passing through the element at a scanning point is noted by a sensor which converts radiation received into an electrical signal. Most generally this electronic signal is further manipulated to form a useful electronic record of the image. For example, the electrical signal can be passed through an analog-to-digital converter and sent to a digital computer together with location information required for pixel (point) location within the image. In another embodiment, this electronic signal is encoded with colorimetric or tonal information to form an electronic record that is suitable to allow reconstruction of the image into viewable forms such as computer monitor displayed images, television images, printed images, and so forth.

One of the challenges encountered in producing images from information extracted by scanning is that the number of pixels of information available for viewing is only a fraction of that available from a comparable classical photographic print. It is, therefore, even more important in scan imaging to maximize the quality of the image information available. Enhancing image sharpness and minimizing the impact of aberrant pixel signals (i.e., noise) are common approaches to enhancing image quality. A conventional technique for minimizing the impact of aberrant pixel signals is to adjust each pixel density reading to a weighted average value by factoring in readings from adjacent pixels, closer adjacent pixels being weighted more heavily.

The elements of the invention can have density calibration patches derived from one or more patch areas on a portion of unexposed photographic recording material that was subjected to reference exposures, as described by Wheeler et al U.S. Pat. No. 5,649,260, Koeng at al U.S. Pat. No. 5,563,717, and by Cosgrove et al U.S. Pat. No. 5,644,647.

Illustrative systems of scan signal manipulation, including techniques for maximizing the quality of image records, are disclosed by Bayer U.S. Pat. No. 4,553,156; Urabe et al U.S. Pat. No. 4,591,923; Sasaki et al U.S. Pat. No. 4,631,578; Alkofer U.S. Pat. No. 4,654,722; Yamada et al U.S. Pat. No. 4,670,793; Klees U.S. Pat. Nos. 4,694,342 and 4,962,542; Powell U.S. Pat. No. 4,805,031; Mayne et al U.S. Pat. No. 4,829,370; Abdulwahab U.S. Pat. No. 4,839,721; Matsunawa et al U.S. Pat. Nos. 4,841,361 and 4,937,662; Mizukoshi et al U.S. Pat. No. 4,891,713; Petilli U.S. Pat. No. 4,912,569; Sullivan et al U.S. Pat. Nos. 4,920,501 and 5,070,413; Kimoto et al U.S. Pat. No. 4,929,979; Hirosawa et al U.S. Pat. No. 4,972,256; Kaplan U.S. Pat. No. 4,977,521; Sakai U.S. Pat. No. 4,979,027; Ng U.S. Pat. No. 5,003,494; Katayama et al U.S. Pat. No. 5,008,950; Kimura et al U.S. Pat. No. 5,065,255; Osamu et al U.S. Pat. No. 5,051,842; Lee et al U.S. Pat. No. 5,012,333; Bowers et al U.S. Pat. No. 5,107,346; Telle U.S. Pat. No. 5,105,266; MacDonald et al U.S. Pat. No. 5,105,469; and Kwon et al U.S. Pat. No. 5,081,692. Techniques for color balance adjustments during scanning are disclosed by Moore et al U.S. Pat. No. 5,049,984 and Davis U.S. Pat. No. 5,541,645.

The digital color records once acquired are in most instances adjusted to produce a pleasingly color balanced image for viewing and to preserve the color fidelity of the image bearing signals through various transformations or renderings for outputting, either on a video monitor or when printed as a conventional color print. Preferred techniques for transforming image bearing signals after scanning are disclosed by Giorgianni et al U.S. Pat. No. 5,267,030, the disclosures of which are herein incorporated by reference. The signal transformation techniques of Giorgianni et al '030 described in connection with FIG. 8 represent a specifically preferred technique for obtaining a color balanced image for viewing.

Further illustrations of the capability of those skilled in the art to manage color digital image information are provided by Giorgianni and Madden *Digital Color Management*, Addison-Wesley, 1998.

Figure 5:
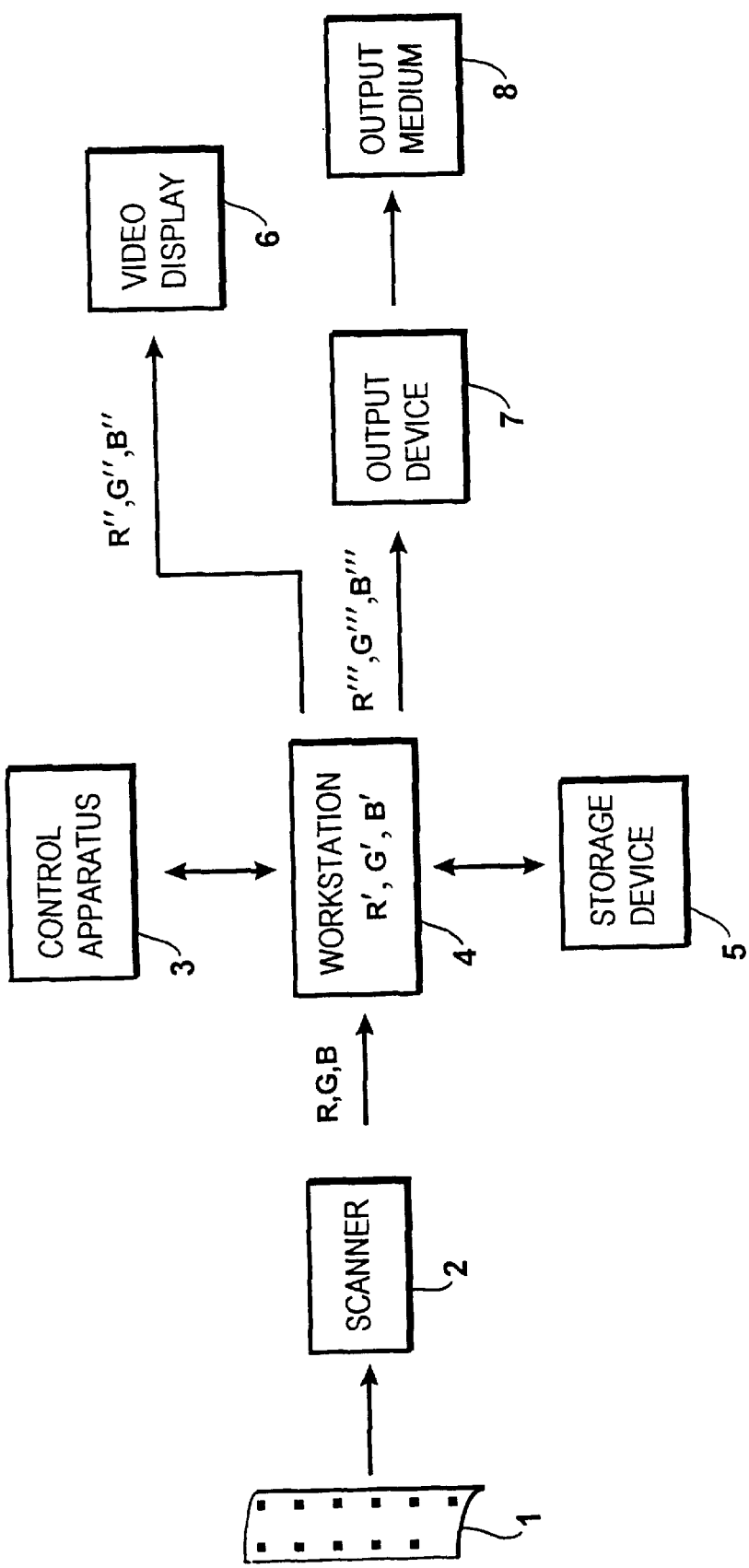
FIG. 5 shows in block diagram form an apparatus for processing and viewing image information obtained by scanning the color negative elements of the invention.

FIG. 5 shows, in block diagram form, the manner in which the image information provided by the color negative elements of the invention is contemplated to be used. An image scanner 2 is used to scan by transmission an imagewise exposed and photographically processed color negative element 1 according to the invention. The scanning beam is most conveniently a beam of white light that is split after passage through the layer units and passed through filters to create separate image records—red recording layer unit image record (R), green recording layer unit image record (G), and blue recording layer unit image record (B). Instead of splitting the beam, blue, green, and red filters can be sequentially caused to intersect the beam at each pixel location. In still another scanning variation, separate blue, green, and red light beams, as produced by a collection of light emitting diodes, can be directed at each pixel location. As the element 1 is scanned pixel-by-pixel using an array detector, such as an array charge-coupled device (CCD), or line-by-line using a linear array detector, such as a linear array CCD, a sequence of R, G, and B picture element signals are generated that can be correlated with spatial location information provided from the scanner. Signal intensity and location information is fed to a workstation 4, and the information is transformed into an electronic form R', G', and B', which can be stored in any convenient storage device 5.

In motion imaging industries, a common approach is to transfer the color negative film information into a video signal using a telecine transfer device. Two types of telecine transfer devices are most common: (1) a flying spot scanner using photomultiplier tube detectors or (2) CCD's as sensors. These devices transform the scanning beam that has passed through the color negative film at each pixel location into a voltage. The signal processing then inverts the electrical signal in order to render a positive image. The signal is then amplified and modulated and fed into a cathode ray tube monitor to display the image or recorded onto magnetic tape for storage. Although both analog and digital image signal manipulations are contemplated, it is preferred to place the signal in a digital form for manipulation, since the overwhelming majority of computers are now digital and this facilitates use with common computer peripherals, such as magnetic tape, a magnetic disk, or an optical disk.

A video monitor 6, which receives the digital image information modified for its requirements, indicated by R", G", and B", allows viewing of the image information received by the workstation. Instead of relying on a cathode ray tube of a video monitor, a liquid crystal display panel or any other convenient electronic image viewing device can be substituted. The video monitor typically relies upon a picture control apparatus 3, which can include a keyboard and cursor, enabling the workstation operator to provide image manipulation commands for modifying the video image displayed and any image to be recreated from the digital image information.

Any modifications of the image can be viewed as they are being introduced on the video display 6 and stored in the storage device 5. The modified image information R''', G''', and B''' can be sent to an output device 7 to produce a recreated image for viewing. The output device can be any convenient conventional element writer, such as a thermal dye transfer, ink-jet, electrostatic, electrophotographic, or other type of printer. The output device can be used to control the exposure of a conventional silver halide color paper. The output device creates an output medium 8 that bears the recreated image for viewing. It is the image in the output medium that is ultimately viewed and judged by the end user for noise (granularity), sharpness, contrast, and color balance. The image on a video display may also ultimately be viewed and judged by the end user for noise, sharpness, tone scale, color balance, and color reproduction, as in the case of images transmitted between parties on the World Wide Web of the Internet computer network.

Using an arrangement of the type shown in FIG. 5, the images contained in color negative elements in accordance with the invention are converted to digital form, manipulated, and recreated in a viewable form following the procedure described in Giorgianni et al U.S. Pat. No. 5,267,030. Color negative recording materials according to the invention can be used with any of the suitable methods described in U.S. Pat. No. 5,257,030. In one preferred embodiment, Giorgianni et al provides for a method and means to convert the R, G, and B image-bearing signals from a transmission scanner to an image manipulation and/or storage metric which corresponds to the trichromatic signals of a reference image-producing device such as a film or paper writer, thermal printer, video display, etc. The metric values correspond to those which would be required to appropriately reproduce the color image on that device. For example, if the reference image producing device was chosen to be a specific video display, and the intermediary image data metric was chosen to be the R', G', and B' intensity modulating signals (code values) for that reference video display, then for an input film, the R, G, and B image-bearing signals from a scanner would be transformed to the R', G', and B' code values corresponding to those which would be required to appropriately reproduce the input image on the reference video display. A data-set is generated from which the mathematical transformations to convert R, G, and B image-bearing signals to the aforementioned code values are derived. Exposure patterns, chosen to adequately sample and cover the useful exposure range of the film being calibrated, are created by exposing a pattern generator and are fed to an exposing apparatus. The exposing apparatus produces trichromatic exposures on film to create test images consisting of approximately 150 color patches. Test images may be created using a variety of methods appropriate for the application. These methods include: using exposing apparatus such as a sensitometer, using the output device of a color imaging apparatus, recording images of test objects of known reflectances illuminated by known light sources, or calculating trichromatic exposure values using methods known in the photographic art. If input films of different speeds are used, the overall red, green, and blue exposures must be properly adjusted for each film in order to compensate for the relative speed differences among the films. Each film thus receives equivalent exposures, appropriate for its red, green, and blue speeds. The exposed film is processed chemically. Film color patches are read by transmission scanner which produces R, G, and B image-bearing signals corresponding each color patch. Signal-value patterns of code value pattern generator produces RGB intensity-modulating signals which are fed to the reference video display. The R', G', and B' code values for each test color are adjusted such that a color matching apparatus, which may correspond to an instrument or a human observer, indicates that the video display test colors match the positive film test colors or the colors of a printed negative. A transform apparatus creates a transform relating the R, G, and B image-bearing signal values for the film's test colors to the R', G', and B' code values of the corresponding test colors.

The mathematical operations required to transform R, G, and B image-bearing signals to the intermediary data may consist of a sequence of matrix operations and look-up tables (LUT's).

Figure 6:
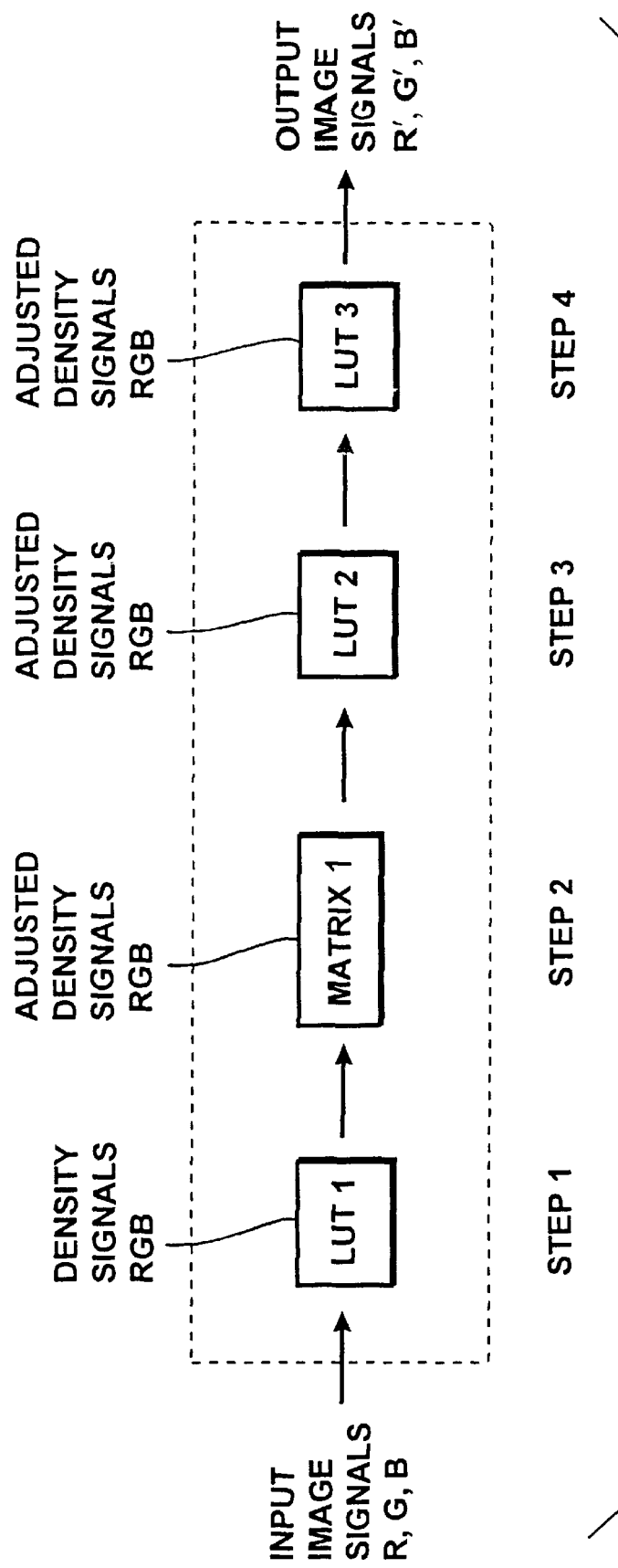
FIG. 6 is a block diagram showing electronic signal processing of the input trichromatic image-bearing signals derived from scanning a color negative recording material in accordance with a preferred embodiment of the invention.

Referring to FIG. 6, in a preferred embodiment of the present invention, input image-bearing signals R, G, and B are transformed to intermediary data values corresponding to the R', G', and B' output image-bearing signals required to appropriately reproduce the color image on the reference output device as follows:

(1) The R, G, and B image-bearing signals, which correspond to the measured transmittances of the film, are converted to corresponding densities in the computer used to receive and store the signals from a film scanner by means of 1-dimensional look-up table LUT 1.

(2) The densities from step (1) are then transformed using matrix 1 derived from a transform apparatus to create intermediary image-bearing signals.

(3) The densities of step (2) are optionally modified with a 1-dimensional look-up table LUT 2 derived such that the neutral scale densities of the input film are transformed to the neutral scale densities of the reference.

(4) The densities of step (3) are transformed through a 1-dimensional look-up table LUT 3 to create corresponding R', G', and B' output image-bearing signals for the reference output device.

It will be understood that individual look-up tables are typically provided for each input color. In one embodiment, three 1-dimensional look-up tables can be employed, one for each of a red, green, and blue color record. In another embodiment, a multi-dimensional look-up table can be employed as described by D'Errico at U.S. Pat. No. 4,941,039. It will be appreciated that the output image-bearing signals for the reference output device of step 4 above may be in the form of device-dependent code values or the output image-bearing signals may require further adjustment to become device specific code values. Such adjustment may be accomplished by further matrix transformation or 1-dimensional look-up table transformation, or a combination of such transformations to properly prepare the output image-bearing signals for any of the steps of transmitting, storing, printing, or displaying them using the specified device.

In a second preferred embodiment of the invention, the R, G, and B image-bearing signals from a transmission scanner are converted to an image manipulation and/or storage metric which corresponds to a measurement or description of a single reference image-recording device and/or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured RGB densities of that reference film, then for an input color negative film according to the invention, the R, G, and B image-bearing signals from a scanner would be transformed to the R', G', and B' density values corresponding to those of an image which would have been formed by the reference color negative film had it been exposed under the same conditions under which the color negative recording material according to the invention was exposed.

Exposure patterns, chosen to adequately sample and cover the useful exposure range of the film being calibrated, are created by exposing a pattern generator and are fed to an exposing apparatus. The exposing apparatus produces trichromatic exposures on film to create test images consisting of approximately 150 color patches. Test images may be created using a variety of methods appropriate for the application. These methods include: using exposing apparatus such as a sensitometer, using the output device of a color imaging apparatus, recording images of test objects of known reflectances illuminated by known light sources, or calculating trichromatic exposure values using methods known in the photographic art. If input films of different speeds are used, the overall red, green, and blue exposures must be properly adjusted for each film in order to compensate for the relative speed differences among the films. Each film thus receives equivalent exposures, appropriate for its red, green, and blue speeds. The exposed film is processed chemically. Film color patches are read by a transmission scanner which produces R, G, and B image-bearing signals corresponding each color patch and by a transmission densitometer which produces R', G', and B' density values corresponding to each patch. A transform apparatus creates a transform relating the R, G, and B image-bearing signal values for the film's test colors to the measured R', G', and B' densities of the corresponding test colors of the reference color negative film. In another preferred variation, if the reference image recording medium was chosen to be a specific color negative film, and the intermediary image data metric was chosen to be the predetermined R', G', and B' intermediary densities of step 2 of that reference film, then for an input color negative film according to the invention, the R, G, and B image-bearing signals from a scanner would be transformed to the R', G', and B' intermediary density values corresponding to those of an image which would have been formed by the reference color negative film had it been exposed under the same conditions under which the color negative recording material according to the invention was exposed.

Thus each input film calibrated according to the present method would yield, insofar as possible, identical intermediary data values corresponding to the R', G', and B' code values required to appropriately reproduce the color image which would have been formed by the reference color negative film on the reference output device. Uncalibrated films may also be used with transformations derived for similar types of films, and the results would be similar to those described.

The mathematical operations required to transform R, G, and B image-bearing signals to the intermediary data metric of this preferred embodiment may consist of a sequence of matrix operations and dimensional LUTs. Three tables are typically provided for the three input colors. It is appreciated that such transformations can also be accomplished in other embodiments by employing a single mathematical operation or a combination of mathematical operations in the computational steps produced by the host computer including, but not limited to, matrix algebra, algebraic expressions dependent on one or more of the image-bearing signals, and n-dimensional LUTs. In one embodiment, matrix 1 of step 2 is a 3×3 matrix. In a more preferred embodiment, matrix 1 of step 2 is a 3×10 matrix. In a preferred embodiment, the 1-dimensional LUT 3 in step 4 transforms the intermediary image-bearing signals according to a color photographic paper characteristic curve, thereby reproducing normal color print image tone scale. In another preferred embodiment, LUT 3 of step 4 transforms the intermediary image-bearing signals according to a modified viewing tone scale that is more pleasing, such as possessing lower image contrast.

Due to the complexity of these transformations, it should be noted that the transformation from R, G, and B to R', G', and B' may often be better accomplished by a 3-dimensional LUT. Such 3-dimensional LUTs may be developed according to the teachings J. D'Errico in U.S. Pat. No. 4,941,039.

It is to be appreciated that while the images are in electronic form, the image processing is not limited to the specific manipulations described above. While the image is in this form, additional image manipulation may be used including, but not limited to, standard scene balance algorithms (to determine corrections for density and color balance based on the densities of one or more areas within the negative), tone scale manipulations to amplify film underexposure gamma, non-adaptive or adaptive sharpening via convolution or unsharp masking, red-eye reduction, and non-adaptive or adaptive grain-suppression. Moreover, the image may be artistically manipulated, zoomed, cropped, and combined with additional images or other manipulations known in the art. Once the image has been corrected and any additional image processing and manipulation has occurred, the image may be electronically transmitted to a remote location or locally written to a variety of output devices including, but not limited to, silver halide film or paper writers, thermal printers, electrophotographic printers, ink-jet printers, display monitors, CD disks, optical and magnetic electronic signal storage devices, and other types of storage and display devices as known in the art.

EXAMPLES

The invention can be better appreciated by reference to the following specific embodiments. The suffix (C) designates control or comparative color negative films, while the suffix (E) indicates example color negative films.

All coating coverages are reported in parenthesis in terms of $g/m^2$, except as otherwise indicated. Silver halide coating coverages are reported in terms of silver. The symbol "M %" indicates mole percent. ECD and t are reported as mean grain values. Halides in mixed halide grains and emulsions are named in order of ascending concentrations. Gamma (γ) for each color record is the maximum slope of the characteristic curve between a point on the curve lying at a density of 0.15 above minimum density (Dmin) and a point on the characteristic curve at 0.9 log E higher exposure level, where E is exposure in lux-seconds.

| Glossary of Acronyms | |
|---|---|
| HBS-1 | Tritoluoyl phosphate |
| HBS-2 | Di-n-butyl phthalate |
| HBS-3 | N-n-Butyl acetanilide |
| HBS-4 | Tris(2-ethylhexyl)phosphate |
| HBS-5 | N,N-Diethyl lauramide |
| HBS-6 | Di-n-butyl sebacate |
| H-1 | Bis(vinylsulfonyl)methane |

ST-1

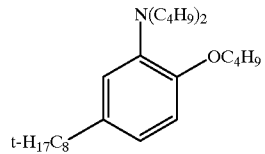

C-1

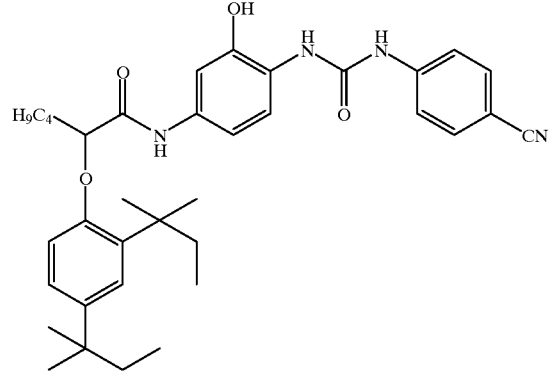

C-2

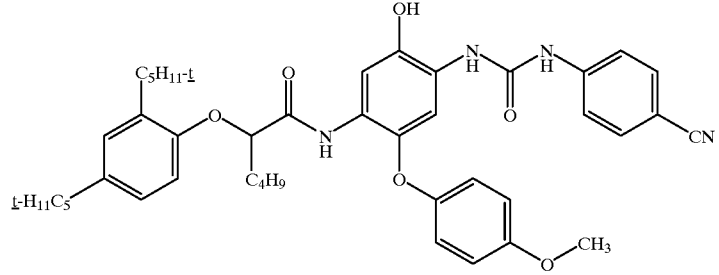

-continued
| Glossary of Acronyms |
|---|
| M-1 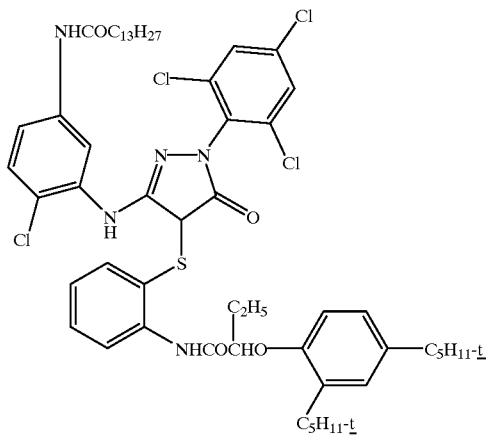 |
| Y-1 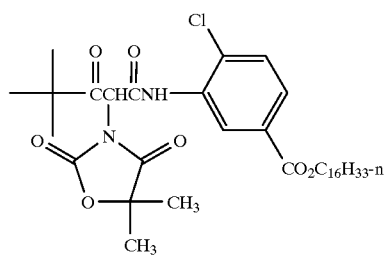 |
| DIR-1 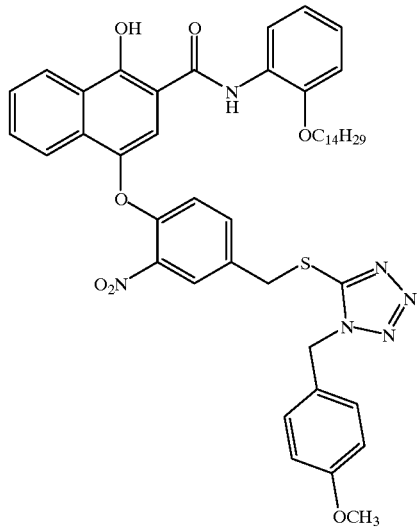 |
| DIR-2 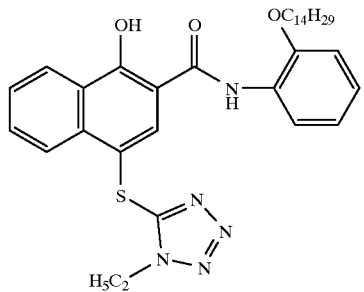 |

Glossary of Acronyms
DIR-3
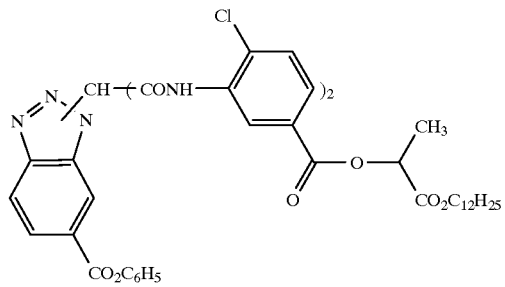
DIR-4
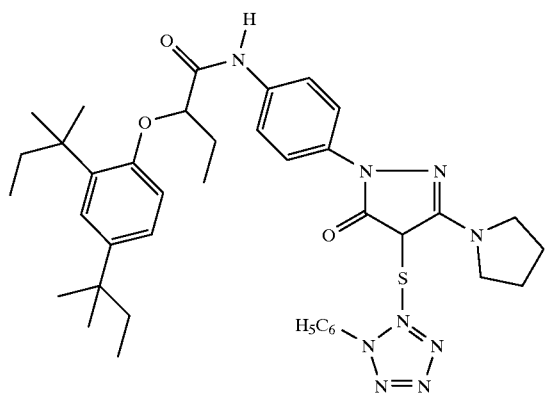
DIR-5
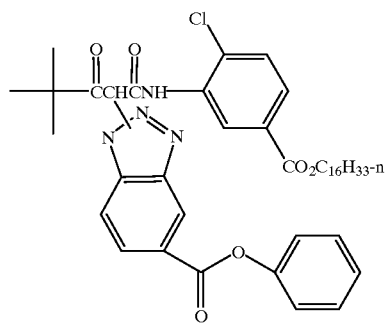
DIR-6
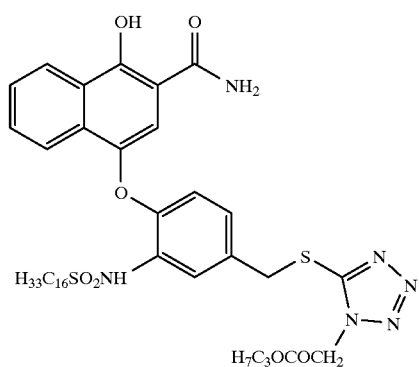

Glossary of Acronyms
DIR-7
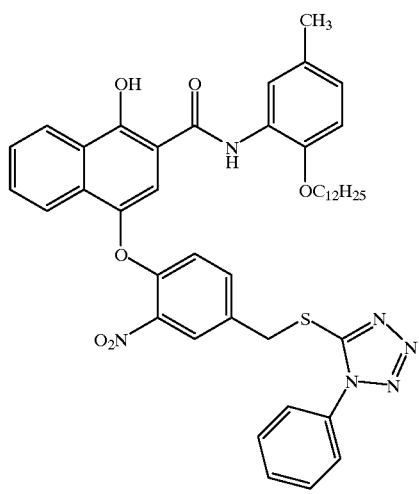
CM-1
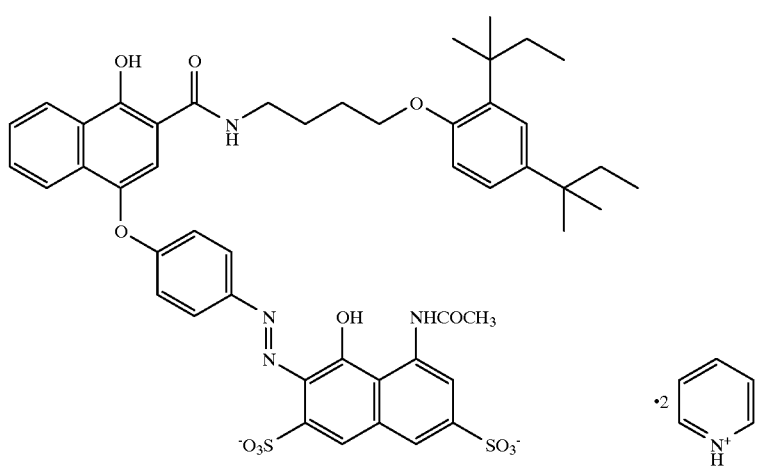
MM-1
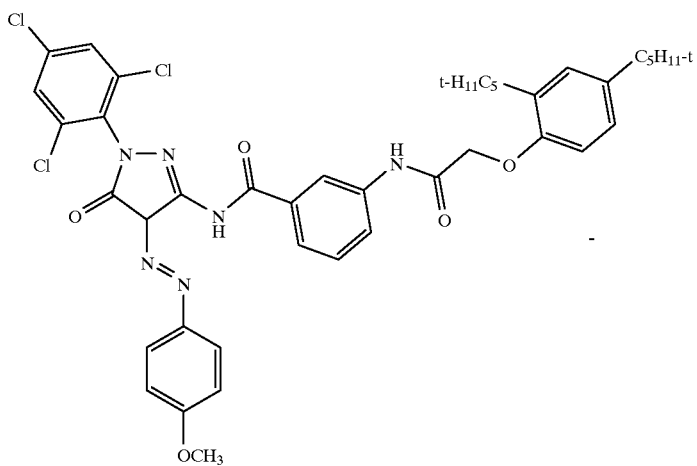

37
-continued
Glossary of Acronyms
MM-2
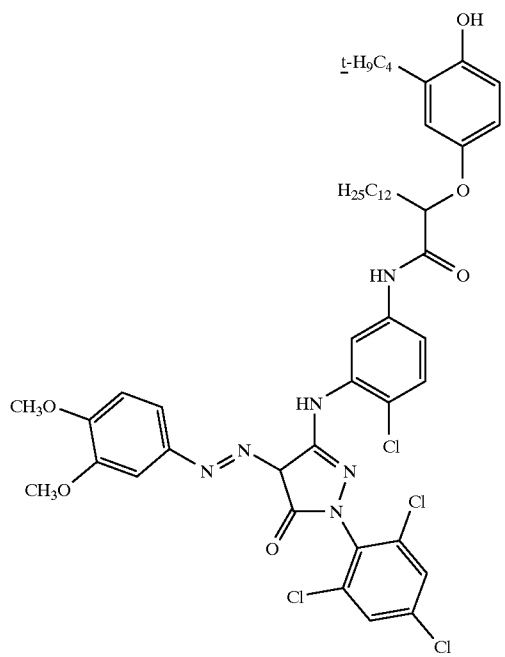
MD-1
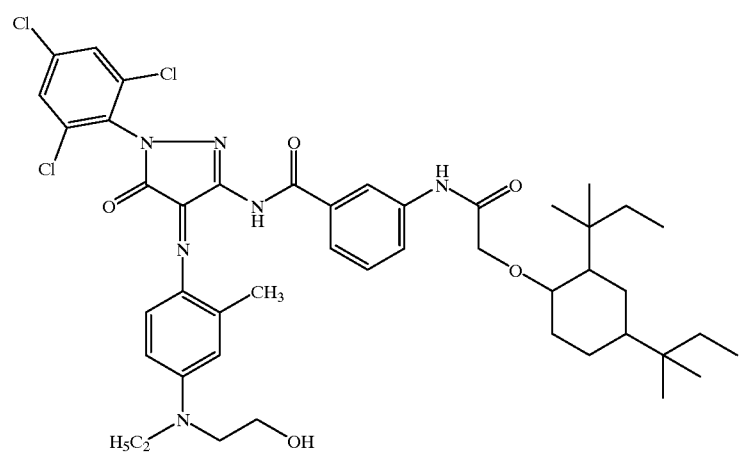
MD-2
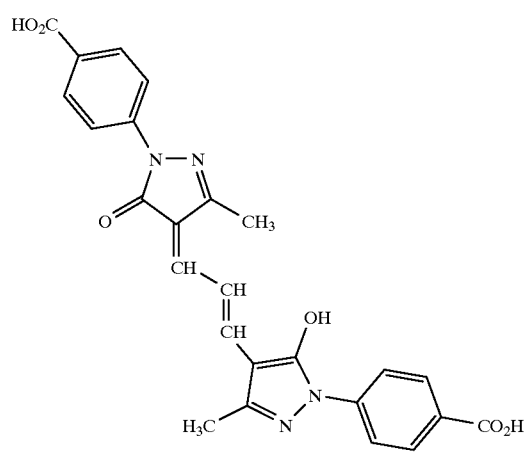

-continued
Glossary of Acronyms
CD-1
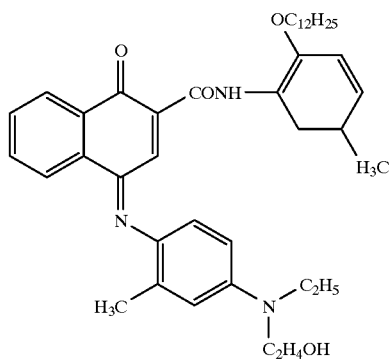
CD-2
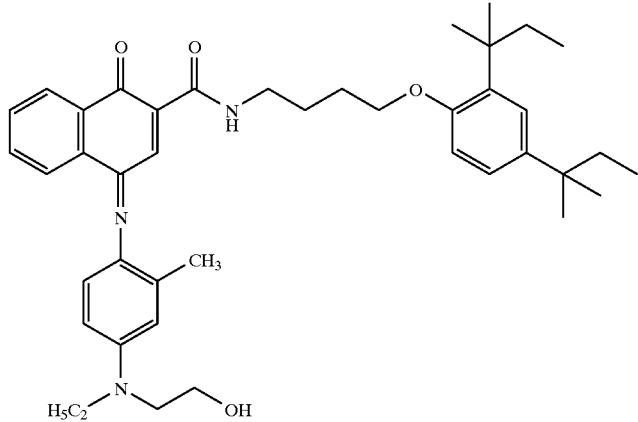
B-1
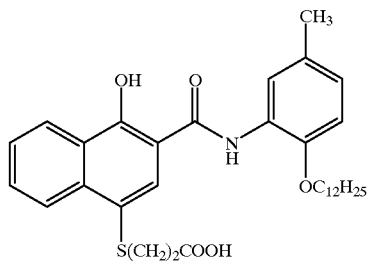
YD-1
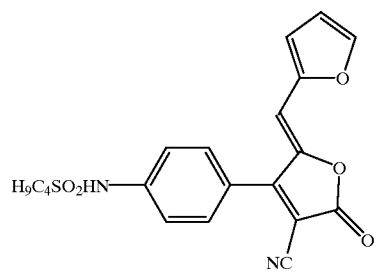
UV-1
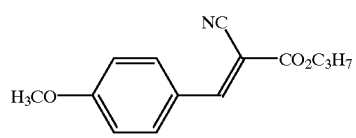

Glossary of Acronyms

UV-2 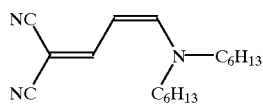

S-1 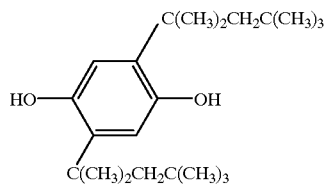

S-2 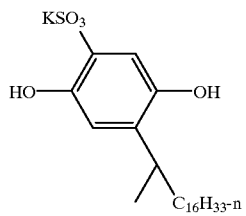

S-3 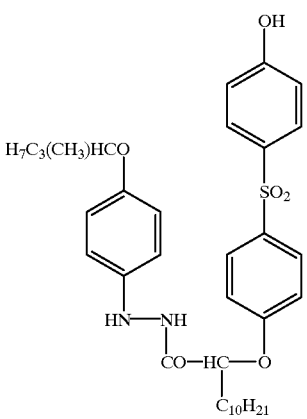

Color Negative Film (CNF) Elements

Samples 001 through 102

Sample 001

This sample was prepared by applying the following layers in the sequence recited to a transparent film support of cellulose triacetate with conventional subbing layers, with the red recording layer unit coated nearest the support. The side of the support to be coated had been prepared by the application of gelatin subbing.

Layer 1: AHU

| | |
|---|---|
| Black colloidal silver sol | (0.151) |
| UV-1 | (0.075) |
| UV-2 | (0.075) |
| Compensatory printing density cyan dye CD-1 | (0.016) |
| Compensatory printing density magenta dye MD-1 | (0.038) |
| Compensatory printing density yellow dye MM-1 | (0.285) |
| HBS-1 | (0.170) |
| HBS-4 | (0.038) |
| Disodium salt of 3,5-disulfocatechol | (0.269) |
| Gelatin | (3.228) |

Layer 2: Interlayer

| | |
|---|---|
| Oxidized developer scavenger S-1 | (0.072) |
| HBS-4 | (0.113) |
| Gelatin | (0.538) |

Layer 3: SRU

This layer was comprised of a blend of a lower and higher (lower and higher grain ECD) sensitivity, red-sensitized tabular silver iodobromide emulsions respectively containing 1.5 M % and 4.1 M % iodide, based on silver.

| | |
|---|---|
| AgIBr (0.55 μm ECD, 0.08 μm t) | (0.484) |
| AgIBr (0.66 μm ECD, 0.12 μm t) | (0.430) |
| Bleach accelerator coupler B-1 | (0.054) |
| Oxidized Developer Scavenger S-3 | (0.183) |
| DIR-6 | (0.013) |
| Cyan dye forming coupler C-1 | (0.344) |
| Cyan dye forming coupler C-2 | (0.038) |
| HBS-2 | (0.026) |
| HBS-5 | (0.116) |
| HBS-6 | (0.118) |

Layer 4: MRU

This layer was comprised of a red-sensitized tabular silver iodobromide emulsion containing 4.1 M % iodide, based on silver.

| | |
|---|---|
| AgIBr (1.30 μm ECD, 0.12 μm t) | (1.184) |
| Bleach accelerator coupler B-1 | (0.022) |
| DIR-2 | (0.011) |
| DIR-6 | (0.011) |
| Oxidized Developer Scavenger S-1 | (0.011) |
| Oxidized Developer Scavenger S-3 | (0.183) |
| Cyan dye forming coupler C-1 | (0.086) |
| Cyan dye forming coupler C-2 | (0.086) |
| HBS-1 | (0.044) |
| HBS-2 | (0.022) |
| HBS-4 | (0.017) |
| HBS-5 | (0.074) |
| HBS-6 | (0.097) |
| TAI | (0.019) |
| Gelatin | (1.560) |

Layer 5: FRU

This layer was comprised of a red-sensitized tabular silver iodobromide emulsion containing 3.7 M % iodide, based on silver.

| | |
|---|---|
| AgIBr (2.61 μm ECD, 0.12 μm t) | (1.291) |
| Bleach accelerator coupler B-1 | (0.003) |
| DIR-2 | (0.011) |
| DIR-6 | (0.011) |
| Oxidized Developer Scavenger S-1 | (0.014) |
| Cyan dye forming coupler C-1 | (0.065) |
| Cyan dye forming coupler C-2 | (0.075) |
| HBS-1 | (0.044) |
| HBS-2 | (0.022) |
| HBS-4 | (0.018) |
| HBS-5 | (0.004) |
| HBS-6 | (0.161) |
| TAI | (0.020) |
| Gelatin | (1.829) |

Layer 6: Interlayer

| | |
|---|---|
| Magenta filter dye MD-2 | (0.065) |
| Oxidized developer scavenger S-1 | (0.108) |
| HBS-4 | (0.161) |
| Gelatin | (1.076) |

Layer 7: SGU

This layer was comprised of a blend of a lower and higher (lower and higher grain ECD) sensitivity, green-sensitized tabular silver iodobromide emulsions respectively containing 2.6 M % and 4.1 M % iodide, based on silver.

| | |
|---|---|
| AgIBr (0.81 μm ECD, 0.12 μm t) | (0.237) |
| AgIBr (0.92 μm ECD, 0.12 μm t) | (0.129) |
| Bleach accelerator coupler B-1 | (0.012) |
| DIR-6 | (0.012) |
| Oxidized Developer Scavenger S-1 | (0.022) |
| Oxidized Developer Scavenger S-3 | (0.183) |
| Magenta dye forming coupler M-1 | (0.301) |
| Stabilizer ST-1 | (0.062) |
| HBS-1 | (0.241) |
| HBS-2 | (0.024) |
| HBS-4 | (0.033) |
| HBS-5 | (0.061) |
| TAI | (0.006) |
| Gelatin | (1.184) |

Layer 8: MGU

This layer was comprised of a blend of a lower and higher (lower and higher grain ECD) sensitivity, green-sensitized tabular silver iodobromide emulsions each containing 4.1 M % iodide, based on silver.

| | |
|---|---|
| AgIBr (0.92 μm ECD, 0.12 μm t) | (0.108) |
| AgIBr (1.22 μm ECD, 0.11 μm t) | (1.184) |
| Bleach accelerator coupler B-1 | (0.005) |
| DIR-2 | (0.009) |
| DIR-6 | (0.011) |
| Oxidized Developer Scavenger S-1 | (0.011) |
| Oxidized Developer Scavenger S-3 | (0.183) |
| Magenta dye forming coupler M-1 | (0.113) |
| HBS-1 | (0.125) |
| HBS-2 | (0.022) |
| HBS-4 | (0.016) |
| HBS-5 | (0.053) |
| Stabilizer ST-1 | (0.022) |
| TAI | (0.020) |
| Gelatin | (1.560) |

Layer 9: FGU

This layer was comprised of a green-sensitized tabular silver iodobromide emulsion containing 4.1 M % iodide, based on silver.

| | |
|---|---|
| AgIBr (2.49 μm ECD, 0.14 μm t) | (0.968) |
| DIR-2 | (0.009) |
| DIR-6 | (0.011) |
| Oxidized Developer Scavenger S-1 | (0.011) |
| Magenta dye forming coupler M-1 | (0.097) |
| HBS-1 | (0.112) |
| HBS-2 | (0.022) |
| HBS-4 | (0.016) |
| Stabilizer ST-1 | (0.020) |
| TAI | (0.012) |
| Gelatin | (1.560) |

Layer 10: Yellow Filter Layer

| | |
|---|---|
| Yellow filter dye YD-1 | (0.108) |
| Oxidized developer scavenger S-1 | (0.075) |
| HBS-4 | (0.113) |
| Gelatin | (1.076) |

Layer 11: SBU

This layer was comprised of a blend of a lower, medium, and higher (lower, medium, and higher grain ECD) sensitivity, blue-sensitized tabular silver iodobromide emulsions respectively containing 1.5 M %, 1.5 M % and 4.1 M % iodide, based on silver.

| | |
|---|---|
| AgIBr (0.55 μm ECD, 0.08 μm t) | (0.301) |
| AgIBr (0.77 μm ECD, 0.14 μm t) | (0.226) |
| AgIBr (1.25 μm ECD, 0.14 μm t) | (0.355) |
| Bleach accelerator coupler B-1 | (0.003) |
| DIR-6 | (0.011) |
| Oxidized Developer Scavenger S-3 | (0.183) |
| Yellow dye forming coupler Y-1 | (0.710) |
| HBS-2 | (0.022) |
| HBS-5 | (0.050) |
| HBS-6 | (0.151) |

-continued

| | |
|---|---|
| TAI | (0.014) |
| Gelatin | (1.506) |

Layer 12: FBU

This layer was comprised of a blue-sensitized silver iodobromide emulsion containing 9.0 M % iodide, based on silver.

| | |
|---|---|
| AgIBr (1.04 μm ECD) | (0.699) |
| Bleach accelerator coupler B-1 | (0.004) |
| DIR-6 | (0.013) |
| Yellow dye forming coupler Y-1 | (0.140) |
| HBS-2 | (0.026) |
| HBS-5 | (0.005) |
| HBS-6 | (0.118) |
| TAI | (0.011) |
| Gelatin | (1.506) |

Layer 13: Ultraviolet Filter Layer

| | |
|---|---|
| Dye UV-1 | (0.108) |
| Dye UV-2 | (0.108) |
| Compensatory printing density cyan dye CD-1 | (0.004) |
| Unsensitized silver bromide Lippmann emulsion | (0.215) |
| HBS-1 | (0.168) |
| Gelatin | (0.699) |

Layer 14: Protective Overcoat Layer

| | |
|---|---|
| Polymethylmethacrylate matte beads | (0.005) |
| Soluble polymethylmethacrylate matte beads | (0.108) |
| Silicone lubricant | (0.039) |
| Gelatin | (0.888) |

This film was hardened at the time of coating with 1.75% by weight of total gelatin of hardener H-1. Surfactants, coating aids, soluble absorber dyes, antifoggants, stabilizers, antistatic agents, biostats, biocides, and other addenda chemicals were added to the various layers of this sample, as is commonly practiced in the art.

Sample 002

This sample was prepared by applying the following layers in the sequence recited to a transparent film support of cellulose triacetate with conventional subbing layers, with the red recording layer unit coated nearest the support. The side of the support to be coated had been prepared by the application of gelatin subbing. The silver halide emulsions contained in Sample 002 are identical to those contained in those respective layers of Sample 001; the coverages of the Sample 002 emulsions in these layers differ inconsequentially from the Sample 001 coverages.

Layer 1: AHU

| | |
|---|---|
| Black colloidal silver sol | (0.107) |
| UV-1 | (0.075) |
| UV-2 | (0.075) |
| Oxidized developer scavenger S-1 | (0.161) |
| Compensatory printing density cyan dye CD-2 | (0.034) |
| Compensatory printing density magenta dye MD-1 | (0.013) |
| Compensatory printing density yellow dye MM-1 | (0.095) |
| HBS-1 | (0.105) |
| HBS-2 | (0.433) |
| HBS-4 | (0.013) |

-continued

| | |
|---|---|
| Disodium salt of 3,5-disulfocatechol | (0.215) |
| Gelatin | (2.152) |

Layer 2: SRU

This layer was comprised of a blend of a lower and higher (lower and higher grain ECD) sensitivity, red-sensitized tabular silver iodobromide emulsions respectively containing 1.5 M % and 4.1 M % iodide, based on silver.

| | |
|---|---|
| AgIBr (0.55 μm ECD, 0.08 μm t) | (0.355) |
| AgIBr (0.66 μm ECD, 0.12 μm t) | (0.328) |
| Bleach accelerator coupler B-1 | (0.075) |
| DIR-1 | (0.015) |
| Cyan dye forming coupler C-1 | (0.359) |
| HBS-2 | (0.405) |
| HBS-5 | (0.098) |
| TM | (0.011) |
| Gelatin | (1.668) |

Layer 3: MRU

This layer was comprised of a red-sensitized tabular silver iodobromide emulsion containing 4.1 M % iodide, based on silver.

| | |
|---|---|
| AgIBr (1.30 μm ECD, 0.12 μm t) | (1.162) |
| Bleach accelerator coupler B-1 | (0.005) |
| DIR-1 | (0.016) |
| Cyan dye forming magenta colored coupler CM-1 | (0.059) |
| Cyan dye forming coupler C-1 | (0.207) |
| HBS-2 | (0.253) |
| HBS-5 | (0.007) |
| TAI | (0.019) |
| Gelatin | (1.291) |

Layer 4: FRU

This layer was comprised of a red-sensitized tabular silver iodobromide emulsion containing 3.7 M % iodide, based on silver.

| | |
|---|---|
| AgIBr (2.61 μm ECD, 0.12 μm t) | (1.160) |
| Bleach accelerator coupler B-1 | (0.005) |
| DIR-1 | (0.027) |
| DIR-2 | (0.048) |
| Cyan dye forming magenta colored coupler CM-1 | (0.022) |
| Cyan dye forming coupler C-1 | (0.323) |
| HBS-1 | (0.194) |
| HBS-2 | (0.274) |
| HBS-5 | (0.007) |
| TAI | (0.010) |
| Gelatin | (1.291) |

Layer 5: Interlayer

| | |
|---|---|
| Oxidized developer scavenger S-1 | (0.086) |
| HBS-4 | (0.129) |
| Gelatin | (0.538) |

Layer 6: SGU

This layer was comprised of a blend of a lower and higher (lower and higher grain ECD) sensitivity, green-sensitized tabular silver iodobromide emulsions respectively containing 2.6 M % and 4.1 M % iodide, based on silver.

| | |
|---|---|
| AgIBr (0.81 μm ECD, 0.12 μm t) | (0.251) |
| AgIBr (0.92 μm ECD, 0.12 μm t) | (0.110) |
| Magenta dye forming yellow colored coupler MM-2 | (0.054) |
| Magenta dye forming coupler M-1 | (0.339) |
| Stabilizer ST-1 | (0.034) |
| HBS-1 | (0.413) |
| TAI | (0.006) |
| Gelatin | (1.184) |

Layer 7: MGU

This layer was comprised of a blend of a lower and higher (lower and higher grain ECD) sensitivity, green-sensitized tabular silver iodobromide emulsions each containing 4.1 M % iodide, based on silver.

| | |
|---|---|
| AgIBr (0.92 μm ECD, 0.12 μm t) | (0.091) |
| AgIBr (1.22 μm ECD, 0.11 μm t) | (1.334) |
| DIR-3 | (0.032) |
| Magenta dye forming yellow colored coupler MM-2 | (0.118) |
| Magenta dye forming coupler M-1 | (0.087) |
| Oxidized developer scavenger S-2 | (0.018) |
| HBS-1 | (0.315) |
| HBS-2 | (0.032) |
| Stabilizer ST-1 | (0.009) |
| TAI | (0.023) |
| Gelatin | (1.668) |

Layer 8: FGU

This layer was comprised of a green-sensitized tabular silver iodobromide emulsion containing 4.1 M % iodide, based on silver.

| | |
|---|---|
| AgIBr (2.49 μm ECD, 0.14 μm t) | (0.909) |
| DIR-4 | (0.003) |
| DIR-6 | (0.032) |
| Oxidized developer scavenger S-2 | (0.023) |
| Magenta dye forming yellow colored coupler MM-2 | (0.054) |
| Magenta dye forming coupler M-1 | (0.113) |
| HBS-1 | (0.216) |
| HBS-2 | (0.064) |
| Stabilizer ST-1 | (0.011) |
| TAI | (0.011) |
| Gelatin | (1.405) |

Layer 9: Yellow Filter Layer

| | |
|---|---|
| Yellow filter dye YD-1 | (0.054) |
| Oxidized developer scavenger S-1 | (0.086) |
| HBS-4 | (0.129) |
| Gelatin | (0.538) |

Layer 10: SBU

This layer was comprised of a blend of a lower, medium, and higher (lower, medium, and higher grain ECD) sensitivity, blue-sensitized tabular silver iodobromide emulsions respectively containing 1.5 M %, 1.5 M %, and 4.1 M % iodide, based on silver.

| | |
|---|---|
| AgIBr (0.55 μm ECD, 0.08 μm t) | (0.140) |
| AgIBr (0.77 μm ECD, 0.14 μm t) | (0.247) |
| AgIBr (1.25 μm ECD, 0.14 μm t) | (0.398) |
| DIR-1 | (0.027) |
| DIR-5 | (0.054) |
| Yellow dye forming coupler Y-1 | (0.915) |
| Cyan dye forming coupler C-1 | (0.027) |
| Bleach accelerator coupler B-1 | (0.011) |
| HBS-1 | (0.538) |

-continued

| | |
|---|---|
| HBS-2 | (0.108) |
| HBS-5 | (0.014) |
| TAI | (0.014) |
| Gelatin | (2.119) |

Layer 11: FBU

This layer was comprised of a blue-sensitized tabular silver iodobromide emulsion containing 9.0 M % iodide, based on silver.

| | |
|---|---|
| AgIBr (1.04 μm ECD) | (0.699) |
| Unsensitized silver bromide Lippmann emulsion | (0.054) |
| Yellow dye forming coupler Y-1 | (0.473) |
| DIR-5 | (0.086) |
| Bleach accelerator coupler B-1 | (0.005) |
| HBS-1 | (0.280) |
| HBS-5 | (0.007) |
| TAI | (0.012) |
| Gelatin | (1.183) |

Layer 12: Ultraviolet Filter Layer

| | |
|---|---|
| Dye UV-1 | (0.108) |
| Dye UV-2 | (0.108) |
| Unsensitized silver bromide Lippmann emulsion | (0.215) |
| HBS-1 | (0.151) |
| Gelatin | (0.699) |

Layer 13: Protective Overcoat Layer

| | |
|---|---|
| Polymethylmethacrylate matte beads | (0.005) |
| Soluble polymethylmethacrylate matte beads | (0.108) |
| Silicone lubricant | (0.039) |
| Gelatin | (0.882) |

This film was hardened at the time of coating with 1.80% by weight of total gelatin of hardener H-1. Surfactants, coating aids, soluble absorber dyes, antifoggants, stabilizers, antistatic agents, biostats, biocides, and other addenda chemicals were added to the various layers of this sample, as is commonly practiced in the art.

Sample 101

This sample was prepared by applying the following layers in the sequence recited to a transparent film support of cellulose triacetate with conventional subbing layers, with the red recording layer unit coated nearest the support. The side of the support to be coated had been prepared by the application of gelatin subbing.

Layer 1: AHU

| | |
|---|---|
| Black colloidal silver sol | (0.151) |
| UV-1 | (0.075) |
| UV-2 | (0.075) |
| Compensatory printing density cyan dye CD-1 | (0.005) |
| Compensatory printing density magenta dye MD-1 | (0.038) |
| Compensatory printing density yellow dye MM-1 | (0.274) |
| HBS-1 | (0.125) |
| HBS-4 | (0.038) |
| Disodium salt of 3,5-disulfocatechol | (0.269) |
| Gelatin | (3.228) |

Layer 2: Interlayer

| | | |
|---|---|---|
| Oxidized developer scavenger S-1 | (0.072) | |
| HBS-4 | (0.108) | |
| Gelatin | (0.538) | |

Layer 3: SRU

This layer was comprised of a blend of a lower, medium, and higher (lower, intermediate, and higher grain ECD) sensitivity, red-sensitized tabular silver iodobromide emulsions respectively containing 1.3 M %, 4.1 M %, and 4.1 M % iodide, based on silver.

| | | |
|---|---|---|
| AgIBr (0.55 μm ECD, 0.08 μm t) | (0.452) | |
| AgIBr (1.00 μm ECD, 0.09 μm t) | (0.355) | |
| AgIBr (1.25 μm ECD, 0.12 μm t) | (0.172) | |
| Bleach accelerator coupler B-1 | (0.075) | |
| Oxidized Developer Scavenger S-3 | (0.183) | |
| DIR-6 | (0.013) | |
| Cyan dye forming coupler C-1 | (0.344) | |
| Cyan dye forming coupler C-2 | (0.172) | |
| HBS-2 | (0.026) | |
| HBS-5 | (0.144) | |
| HBS-6 | (0.118) | |
| TAI | (0.016) | |
| Gelatin | (1.840) | |

Layer 4: MRU

This layer was comprised of a red-sensitized tabular silver iodobromide emulsion containing 3.1 M % iodide, based on silver.

| | | |
|---|---|---|
| AgIBr (2.25 μm ECD, 0.12 μm t) | (1.291) | |
| Bleach accelerator coupler B-1 | (0.022) | |
| DIR-2 | (0.011) | |
| DIR-6 | (0.011) | |
| Oxidized Developer Scavenger S-1 | (0.011) | |
| Oxidized Developer Scavenger S-3 | (0.183) | |
| Cyan dye forming coupler C-1 | (0.108) | |
| Cyan dye forming coupler C-2 | (0.075) | |
| HBS-1 | (0.044) | |
| HBS-2 | (0.022) | |
| HBS-4 | (0.017) | |
| HBS-5 | (0.074) | |
| HBS-6 | (0.043) | |
| TAI | (0.020) | |
| Gelatin | (1.560) | |

Layer 5: FRU

This layer was comprised of a red-sensitized tabular silver iodobromide emulsion containing 3.7 M % iodide, based on silver.

| | | |
|---|---|---|
| AgIBr (4.1 μm ECD, 0.13 μm t) | (1.614) | |
| Bleach accelerator coupler B-1 | (0.003) | |
| DIR-2 | (0.011) | |
| DIR-6 | (0.005) | |
| Oxidized Developer Scavenger S-1 | (0.014) | |
| Cyan dye forming coupler C-2 | (0.151) | |
| HBS-1 | (0.044) | |
| HBS-2 | (0.011) | |
| HBS-4 | (0.021) | |
| HBS-5 | (0.004) | |
| HBS-6 | (0.108) | |
| TAI | (0.026) | |
| Gelatin | (1.829) | |

Layer 6: Interlayer

| | | |
|---|---|---|
| Magenta filter dye MD-2 | (0.065) | |
| Oxidized developer scavenger S-1 | (0.108) | |
| HBS-4 | (0.161) | |
| Gelatin | (1.076) | |

Layer 7: SGU

This layer was comprised of a blend of a lower, medium, and higher (lower, intermediate, and higher grain ECD) sensitivity, green-sensitized tabular silver iodobromide emulsions respectively containing 1.5 M %, 4.1 M %, and 4.1 M % iodide, based on silver.

| | | |
|---|---|---|
| AgIBr (0.69 μm ECD, 0.12 μm t) | (0.226) | |
| AgIBr (1.00 μm ECD, 0.08 μm t) | (0.086) | |
| AgIBr (1.22 μm ECD, 0.11 μm t) | (0.430) | |
| Bleach accelerator coupler B-1 | (0.011) | |
| DIR-6 | (0.012) | |
| Oxidized Developer Scavenger S-1 | (0.022) | |
| Oxidized Developer Scavenger S-3 | (0.183) | |
| Magenta dye forming coupler M-1 | (0.215) | |
| Stabilizer ST-1 | (0.044) | |
| HBS-1 | (0.172) | |
| HBS-2 | (0.024) | |
| HBS-4 | (0.033) | |
| HBS-5 | (0.060) | |
| TAI | (0.014) | |
| Gelatin | (1.184) | |

Layer 8: MGU

This layer was comprised of a green-sensitized tabular silver iodobromide emulsion containing 3.6 M % iodide, based on silver.

| | | |
|---|---|---|
| AgIBr (2.85 μm ECD, 0.12 μm t) | (0.968) | |
| Bleach accelerator coupler B-1 | (0.011) | |
| DIR-2 | (0.009) | |
| DIR-6 | (0.011) | |
| Oxidized Developer Scavenger S-1 | (0.011) | |
| Oxidized Developer Scavenger S-3 | (0.183) | |
| Magenta dye forming coupler M-1 | (0.156) | |
| HBS-1 | (0.159) | |
| HBS-2 | (0.022) | |
| HBS-4 | (0.016) | |
| HBS-5 | (0.060) | |
| Stabilizer ST-1 | (0.032) | |
| TAI | (0.016) | |
| Gelatin | (1.560) | |

Layer 9: FGU

This layer was comprised of a green-sensitized tabular silver iodobromide emulsion containing 3.6 M % iodide, based on silver.

| | | |
|---|---|---|
| AgIBr (3.95 μm ECD, 0.14 μm t) | (1.291) | |
| DIR-2 | (0.009) | |
| DIR-6 | (0.011) | |
| Oxidized Developer Scavenger S-1 | (0.011) | |
| Magenta dye forming coupler M-1 | (0.102) | |
| HBS-1 | (0.116) | |
| HBS-2 | (0.022) | |
| HBS-4 | (0.016) | |
| Stabilizer ST-1 | (0.020) | |
| TAI | (0.015) | |
| Gelatin | (1.560) | |

Layer 10: Yellow Filter Layer

| | |
|---|---|
| Yellow filter dye YD-1 | (0.108) |
| Oxidized developer scavenger S-1 | (0.075) |
| HBS-4 | (0.113) |
| Gelatin | (1.076) |

Layer 11: SBU

This layer was comprised of a blend of a lower, medium and higher (lower, medium and higher grain ECD) sensitivity, blue-sensitized tabular silver iodobromide emulsions respectively containing 1.5 M %, 1.5 M % and 4.1 M % iodide, based on silver.

| | |
|---|---|
| AgIBr (0.55 μm ECD, 0.08 μm t) | (0.258) |
| AgIBr (0.77 μm ECD, 0.14 μm t) | (0.194) |
| AgIBr (1.25 μm ECD, 0.14 μm t) | (0.334) |
| Bleach accelerator coupler B-1 | (0.003) |
| DIR-6 | (0.016) |
| Oxidized Developer Scavenger S-3 | (0.183) |
| Yellow dye forming coupler Y-1 | (0.710) |
| HBS-2 | (0.032) |
| HBS-5 | (0.050) |
| HBS-6 | (0.151) |
| TAI | (0.014) |
| Gelatin | (1.506) |

Layer 12: FBU

This layer was comprised of blend of a lower and higher (higher (tabular) and lower (conventional) grain ECD) sensitivity, blue-sensitized silver iodobromide emulsions respectively containing 4.1 M % and 14 M % iodide, based on silver

| | |
|---|---|
| AgIBr (2.9 μm ECD, 0.13 μm t) | (0.323) |
| AgIBr (1.4 μm ECD) | (0.968) |
| Bleach accelerator coupler B-1 | (0.011) |
| DIR-6 | (0.005) |
| Yellow dye forming coupler Y-1 | (0.215) |
| HBS-2 | (0.011) |
| HBS-5 | (0.014) |
| HBS-6 | (0.108) |
| TAI | (0.008) |
| Gelatin | (1.506) |

Layer 13: Ultraviolet Filter Layer

| | |
|---|---|
| Dye UV-1 | (0.108) |
| Dye UV-2 | (0.108) |
| Compensatory printing density cyan dye CD-1 | (0.005) |
| Unsensitized silver bromide Lippmann emulsion | (0.215) |
| HBS-1 | (0.172) |
| Gelatin | (0.699) |

Layer 14: Protective Overcoat Layer

| | |
|---|---|
| Polymethylmethacrylate matte beads | (0.005) |
| Soluble polymethylmethacrylate matte beads | (0.108) |
| Silicone lubricant | (0.039) |
| Gelatin | (0.888) |

This film was hardened at the time of coating with 1.75% by weight of total gelatin of hardener H-1. Surfactants, coating aids, soluble absorber dyes, antifoggants, stabilizers, antistatic agents, biostats, biocides, and other addenda chemicals were added to the various layers of this sample, as is commonly practiced in the art.

Sample 102

This sample was prepared by applying the following layers in the sequence recited to a transparent film support of cellulose triacetate with conventional subbing layers, with the red recording layer unit coated nearest the support. The side of the support to be coated had been prepared by the application of gelatin subbing. The silver halide emulsions contained in the MRU, FRU, MGU, FGU, and FYU are identical to those contained in those respective layers of Sample 101; the coverages of the Sample 102 emulsions in these layers differ inconsequentially from the Sample 101 coverages.

Layer 1: AHU

| | |
|---|---|
| Black colloidal silver sol | (0.151) |
| UV-1 | (0.075) |
| UV-2 | (0.075) |
| Cyan masking dye CD-1 | (0.037) |
| Magenta masking dye MD-1 | (0.013) |
| Yellow masking dye MM-1 | (0.129) |
| HBS-1 | (0.252) |
| HBS-4 | (0.013) |
| Disodium salt of 3,5-disulfocatechol | (0.269) |
| Gelatin | (1.620) |

Layer 2: Interlayer

| | |
|---|---|
| Oxidized developer scavenger S-1 | (0.075) |
| HBS-4 | (0.113) |
| Gelatin | (0.538) |

Layer 3: SRU

This layer was comprised of a blend of a lower and higher (lower and higher grain ECD) sensitivity, red-sensitized tabular silver iodobromide emulsions both containing 4.1 M %, based on silver.

| | |
|---|---|
| AgIBr (0.74 μm ECD, 0.12 μm t) | (0.312) |
| AgIBr (1.25 μm ECD, 0.12 μm t) | (0.265) |
| Bleach accelerator coupler B-1 | (0.080) |
| Cyan dye forming coupler C-1 | (0.226) |
| Cyan dye forming coupler C-2 | (0.363) |
| Cyan dye forming magenta colored coupler CM-1 | (0.032) |
| HBS-2 | (0.589) |
| HBS-5 | (0.104) |
| TAI | (0.009) |
| Gelatin | (1.668) |

Layer 4: MRU

This layer was comprised of a red-sensitized tabular silver iodobromide emulsion containing 3.1 M % iodide, based on silver.

| | |
|---|---|
| AgIBr (2.25 μm ECD, 0.13 μm t) | (1.173) |
| DIR-2 | (0.011) |
| DIR-7 | (0.011) |
| Cyan dye forming magenta colored coupler CM-1 | (0.032) |
| Cyan dye forming coupler C-2 | (0.181) |
| Oxidized developer scavenger S-1 | (0.011) |
| HBS-1 | (0.044) |
| HBS-2 | (0.181) |
| HBS-3 | (0.022) |
| HBS-4 | (0.017) |
| TAI | (0.019) |
| Gelatin | (1.615) |

Layer 5:FRU

This layer was comprised of a red-sensitized tabular silver iodobromide emulsion containing 3.7 M % iodide, based on silver.

| | |
|---|---|
| AgIBr (4.0 μm ECD, 0.13 μm t) | (1.291) |
| DIR-2 | (0.022) |
| DIR-7 | (0.025) |
| Oxidized developer scavenger S-1 | (0.014) |
| Cyan dye forming coupler C-2 | (0.204) |
| HBS-1 | (0.086) |
| HBS-2 | (0.204) |
| HBS-3 | (0.050) |
| HBS-4 | (0.021) |
| TAI | (0.020) |
| Gelatin | (1.453) |

Layer 6: Interlayer

| | |
|---|---|
| Oxidized developer scavenger S-1 | (0.075) |
| HBS-4 | (0.113) |
| Gelatin | (0.538) |

Layer 7: SGU

This layer was comprised of a blend of a lower and higher (lower and higher grain ECD) sensitivity, green-sensitized tabular silver iodobromide emulsions respectively containing 2.6 M % and 4.1 M % iodide, based on silver.

| | |
|---|---|
| AgIBr (0.88 μm ECD, 0.12 μm t) | (0.537) |
| AgIBr (1.2 μm ECD, 0.12 μm t) | (0.334) |
| Magenta dye forming yellow colored coupler MM-2 | (0.075) |
| Magenta dye forming coupler M-1 | (0.286) |
| Stabilizer ST-1 | (0.029) |
| HBS-1 | (0.407) |
| TAI | (0.014) |
| Gelatin | (1.184) |

Layer 8: MGU

This layer was comprised of a green-sensitized tabular silver iodobromide emulsion containing 3.6 M % iodide, based on silver.

| | |
|---|---|
| AgIBr (2.85 μm ECD, 0.12 μm t) | (0.969) |
| DIR-4 | (0.011) |
| Magenta dye forming yellow colored coupler MM-2 | (0.086) |
| Magenta dye forming coupler M-1 | (0.080) |
| HBS-1 | (0.266) |
| Stabilizer ST-1 | (0.008) |
| TAI | (0.016) |
| Gelatin | (1.560) |

Layer 9: FGU

This layer was comprised of a green-sensitized tabular silver iodobromide emulsion containing 3.6 M % iodide, based on silver.

| | |
|---|---|
| AgIBr (3.95 μm ECD, 0.14 μm t) | (1.292) |
| DIR-4 | (0.003) |
| Magenta dye forming coupler M-1 | (0.084) |
| HBS-1 | (0.082) |
| Stabilizer ST-1 | (0.008) |
| Gelatin | (1.582) |

Layer 10: Yellow Filter Layer

| | |
|---|---|
| Yellow filter dye YD-1 | (0.108) |
| Oxidized developer scavenger S-1 | (0.075) |
| HBS-4 | (0.113) |
| Gelatin | (0.807) |

Layer 11: SBU

This layer was comprised of a blend of a lower, medium, and higher (lower, medium, and higher grain thickness) sensitivity, blue-sensitized tabular silver iodobromide emulsions, respectively, containing 1.3 M %, 1.5 M %, and 6.0 M % iodide, based on silver.

| | |
|---|---|
| AgIBr (0.54 μm ECD, 0.09 μm t) | (0.397) |
| AgIBr (1.03 μm ECD, 0.13 μm t) | (0.081) |
| AgIBr (0.96 μm ECD, 0.26 μm t) | (0.232) |
| DIR-5 | (0.027) |
| Yellow dye forming coupler Y-1 | (0.733) |
| Bleach accelerator coupler B-1 | (0.003) |
| HBS-1 | (0.381) |
| HBS-5 | (0.004) |
| TAI | (0.011) |
| Gelatin | (1.615) |

Layer 12: FBU

This layer was comprised of blend of a lower and higher (higher (tabular) and lower (conventional) grain ECD) sensitivity, blue-sensitized silver iodobromide emulsions respectively containing 4.1 M % and 14 M % iodide, based on silver.

| | |
|---|---|
| AgIBr (2.9 μm ECD, 0.13 μm t) | (0.412) |
| AgIBr (1.4 μm ECD) | (0.902) |
| Yellow dye forming coupler Y-1 | (0.424) |
| DIR-5 | (0.027) |
| Bleach accelerator coupler B-1 | (0.011) |
| HBS-1 | (0.226) |
| HBS-5 | (0.014) |
| Gelatin | (1.700) |

Layer 13: Ultraviolet Filter Layer

| | |
|---|---|
| Dye UV-1 | (0.108) |
| Dye UV-2 | (0.108) |
| Unsensitized silver bromide Lippmann emulsion | (0.215) |
| HBS-1 | (0.151) |
| Gelatin | (0.699) |

Layer 14: Protective Overcoat Layer

| | |
|---|---|
| Polymethylmethacrylate matte beads | (0.005) |
| Soluble polymethylmethacrylate matte beads | (0.108) |
| Silicone lubricant | (0.039) |
| Gelatin | (0.888) |

This film was hardened at the time of coating with 2.00% by weight of total gelatin of hardener H-1. Surfactants, coating aids, soluble absorber dyes, antifoggants, stabilizers, antistatic agents, biostats, biocides, and other addenda chemicals were added to the various layers of this sample, as is commonly practiced in the art.

In order to establish the utility of the photographic recording materials, each of the CNF 101–102 samples was exposed to white light from a tungsten source filtered by a Daylight Va filter to 5500K at $\frac{1}{500}^{th}$ of a second through 1.5 inconel neutral density and a 0–4 log E graduated tablet with 0.20 density increment steps. Additional white light exposures were made to Samples 001 and CNF 002, which were individually exposed for $\frac{1}{500}^{th}$ of a second to white light from the tungsten bulb source that was filtered by a Daylight Va filter to 5500K through a 1.2 inconel neutral density filter and the graduated 0–4.0 density step tablet. The color reversal film, KODAK EKTACHROME™ ELITE II 100 Film (designated Sample 201), was exposed by white light from another tungsten source filtered to 5500K and through a 0–4 density step tablet for ⅕ of a second, in order to optimally determine the characteristic curve of the photographic recording material. The exposed film samples were processed through the KODAK FLEXICOLOR™ C-41 Process, as described by *The British Journal of Photography Annual* of 1988, pp. 196–198. Another description of the use of the KODAK FLEXICOLOR™ C-41 process is provided by *Using Kodak Flexicolor Chemicals*, Kodak Publication No. Z-131, Eastman Kodak Company, Rochester, N.Y. The film samples were then subjected to Status M densitometry and the characteristic curves and photographic performance metrics were determined.

The gamma for each Sample's characteristic curve color records was determined using a Kodak Model G gradient meter between a first characteristic curve reference point lying at a density of 0.15 above minimum density and a second reference point separated from the first reference point by 0.9 log E. The exposure latitude, indicating the exposure range of a characteristic curve segment over which the instantaneous gamma was at least 25% of the gamma as defined above, was also determined. The observed values of gamma and latitude are reported in Table I. Speed values that relate to ISO speed were determined in a similar fashion as described above by metering the exposure required to produce a density of 0.15 above the minimum density of an unexposed region of processed film sample. The method of determination of ISO (ASA) speed of color negative films for still photography is reported in ANSI PH2.27-1981. All of the film samples produced useful imaging characteristics, as illustrated by the values reported in Table I and Table II. Film samples representative of the known art are additionally labeled as "(C)" for clarity.

TABLE I

| Sample | Status M Gamma | | | Latitude (log lux-s) | | |
|---|---|---|---|---|---|---|
| | R | G | B | R | G | B |
| 1. 001 | 0.54 | 0.54 | 0.64 | 3.4+ | 3.4+ | 3.5 |
| 2. 002 (C) | 0.67 | 0.63 | 0.77 | 3.4+ | 3.4+ | 3.4+ |
| 3. 101 | 0.55 | 0.54 | 0.60 | 3.4+ | 3.4+ | 3.4+ |
| 4. 102 (C) | 0.67 | 0.67 | 0.76 | 3.4+ | 3.4+ | 3.4+ |
| 5. 201 (C) | 1.52 | 2.26 | 2.00 | 2.3 | 2.2 | 2.6 |

TABLE II

| Sample | 0.15 Density Speed | | | ISO Speed |
|---|---|---|---|---|
| | R | G | B | R |
| 1. 001 | 346 | 355 | 356 | 454 |
| 2. 002 (C) | 352 | 357 | 352 | 494 |
| 3. 101 | 369 | 368 | 374 | 676 |
| 4. 102 (C) | 375 | 380 | 383 | 847 |

It is observed that Sample 101 yielded apparent lower speeds than Sample 102 despite being comprised of the same MRU, FRU, MGU, FGU, and FYU emulsions at about the same coverages as Sample 102. The gamma produced by Sample 101 is lower than that of 102, and the speed metric relating to a fixed density change underestimated the photographic recording material's true sensitivity. As electronic signal amplification following scanning will be relied upon to normalize the image-bearing signals to the correct output contrast relationships, the spurious speed difference is not material.

In order to characterize the chemical signal processing properties of the color negative recording materials, the gamma ratio of the light recording units was determined. The samples of Table II were exposed for $\frac{1}{50}^{th}$ of a second to white light from a tungsten source filtered to 5500K over a 0–4 log E range in 21 stepped increments, and then they were exposed to that source white light sequentially filtered by narrow band pass red, green, and blue dichroic filters to produce separation exposures. The exposed samples were processed in the KODAK FLEXICOLOR™ C-41 process, and the dried samples were subjected to Status M densitometry. The gamma ratios for each color unit were determined individually by dividing the separation exposure gamma by the respective neutral white light exposure gamma; these results are listed in Table III.

TABLE III

| | Ratio of Separation and Neutral Gamma | | |
|---|---|---|---|
| Sample | Red Light Sensitive Unit | Green Light Sensitive Unit | Blue Light Sensitive Unit |
| 001 | 1.13 | 0.96 | 1.17 |
| 002 (C) | 1.49 | 1.64 | 1.50 |
| 101 | 1.00 | 1.02 | 0.98 |
| 102 (C) | 1.15 | 1.42 | 1.29 |

Samples 101–102 were loaded into 135 system film cartridges as 24 exposure rolls which were then loaded into one-time-use cameras.

The one-time-use cameras were comprised of a single-element fixed focus plastic lens at a focal length of about 30 mm. The focus range was about 1.2 m to infinity. The camera shutter speed was about $\frac{1}{100}^{th}$ of a second. The camera body was about 120×60×35 mm in dimensions.

Pictorial scenes incorporating people and other typical photographic subject matter such as buildings, lawns, foliage and flowers, and blue sky were recorded on both films in a number of outdoor lighting conditions ranging from "bright sunny day" to "overcast" conditions. A second photographic test employing additional portions of these samples was conducted by exposing all of the Samples 001–102 in a studio using single-lens reflex cameras and a scene incorporating models and calibrated neutral and color patches to allow verification of the path of electronic conversions and reconstruction into a viewable image. The one-time-use cameras were opened by lifting or brealing a flap with a tool to recover the film's samples. All exposed film bearing the pictorial scenes was processed through the KODAK FLEXICOLOR™ C-41 process.

Two representative scenes were selected for printing by two methods. Custom 4R optical prints were made by exposing through the color negative images of Samples 101 and 102 onto KODAK EKTACOLOR™ EDGE 5 Paper. The color paper exposures were precisely balanced to produce the optimum print for Sample 102 in each scene using an automated color paper printer under operator control, and the mid tone density and color balance of the Sample 101 print was matched to it. As the gamma and interlayer interimage effects associated with Sample 101 did not match those of 102, an exact match was, of course, impossible. Following exposures, the color paper samples were processed through the KODAK RA-4™ Rapid Access Process. The final print magnification was approximately 4.4×, and the print dimensions were 10 cm×15 cm following trimming. The optical prints derived from Sample 101 are henceforth referred to as Print A prints, and the reference optical prints from Sample 102 are referred to as Print B prints.

Electronic Image Conversion and Digital Printing

To produce the transformation of input image-bearing signals to an image manipulation and/or storage metric which corresponds to the trichromatic signals of a reference image-producing device, such as a color paper writer or a video display as taught by Giorgianni et al, Sample 001, Sample 002, and Sample 102 were exposed through a graduated step chart with 21 steps in 0.2 density increments by white light that was unfiltered or that was filtered by KODAK WRATTEN™ Gelatin Filter Color Compensating CC100 red, green, blue, cyan, magenta, and yellow color filters to provide test images. All of the exposed films were processed through the KODAK FLEXICOLOR™ C-41 process. The patches and images recorded on Samples 001–102 were scanned with a KODAK PROFESSIONAL PCD™ Film Scanner 1000. In the case of Sample 002 and Sample 102, the resulting scanner densities from the color patch set were linearly regressed to derive a matrix (Matrix 1 according to the general method of FIG. 6) that ultimately allowed the preparation of output device code values, which produced printer exposures onto silver halide color paper that accurately reproduced the same color and tonal rendition as the usual optical print of the same objects by those same films, respectively. This method can be thought of as a printing density transform. These transforms could also be utilized to view the reconstructed images following scanning on a monitor, following further routine adjustments to accommodate the display properties of that output device.

An analogous transform was created that was suitable for color negative films of the invention. The scanner densities of Sample 001 were linearly regressed in this case to the intermediary image-bearing signals or printing densities of Sample 002, according to the method shown in FIG. 6. Following a trial of the transform, a 1D-LUT (LUT 2 of the preferred method of FIG. 6) was inserted into the image processing path to adjust the tone scale to match that of Sample 001 and improve neutrality in the underexposure region of the test print. The printing density matrix transformations derived for Sample 001 and Sample 102 (Matrix 1 according to the general method of FIG. 6) are shown in Table IV.

earlier. The Sample 101 scanner densities were transformed with the Sample 001 printing density transform shown earlier according to the preferred method of FIG. 6, which is suitable for similar uncalibrated films of the invention, such as Sample 101. The application of these film-dependent matrix values allowed for the transformation of the recorded scene information from each input film sample followed by expression of the appropriate device-dependent output code values that recreated a viewable image of the scene. Thus, in one example the image-bearing signals were converted to intermediary reference video R", G", and B" image-bearing signals, as illustrated in FIG. 5, and the signals from each film in each scene were normalized for exposure and color balance and gamma of the input photographic recording material in order to produce a match to the reference optical Print B prints. This normalization, or scene balancing, is customarily employed in every image printing operation, whether optical or digital in means of execution.

These intermediary image-bearing signals or encoded values were an accurate representation of the exposures of the original scene, which was verified by a final examination of the video image produced by each sample. The code values of the 20% neutral reference patch in the studio scene and the sky and shadow image portions of the pictorial scenes recorded on each sample (relating to image patch density that would be rendered in a print), and their standard deviations (relating directly to final image noise) were determined. The image portion mean code values of photographic recording materials Samples 101–102, comprising equal R", G", and B" image-bearing signals, as illustrated in FIG. 1, and their standard deviations (indicative of image noise and hence granularity in the Samples 101–102) are reported in Table V.

TABLE V

| Sample | Scene | Mean Code Values | | | Standard Deviations | | |
|---|---|---|---|---|---|---|---|
| | | R" | G" | B" | R" | G" | B" |
| 101 | Studio, | 56.11 | 57.42 | 56.02 | 3.98 | 4.47 | 7.13 |
| 102(C) | 20% Gray | 56.44 | 56.43 | 59.92 | 4.26 | 4.52 | 7.63 |
| 101 | Scene 1, | 45.96 | 13.85 | 12.00 | 2.19 | 0.70 | 0.00 |
| 102(C) | Sky | 49.35 | 18.04 | 16.57 | 3.12 | 1.35 | 0.93 |
| 101 | Scene 2, | 75.68 | 82.58 | 94.10 | 5.06 | 4.98 | 8.49 |
| 102(C) | Shadow | 77.03 | 83.13 | 94.44 | 5.90 | 5.62 | 9.32 |

From Table V it is apparent that the lower signal deviations (noise) were exhibited by Sample 101, which satisfies the requirements of the invention. This confirms the ability

TABLE IV

3 × 10 Matrix derived for Sample 001 is below:

| 1.959 | −0.514 | −0.080 | 0.060 | 0.709 | 0.265 | −0.340 | −0.195 | −0.462 | 0.275 |
| −0.368 | 1.947 | −0.252 | −0.013 | −0.325 | −0.241 | 0.073 | 0.014 | 0.609 | 0.411 |
| −0.045 | −1.151 | 2.465 | 0.293 | 0.747 | 0.188 | −0.123 | −0.436 | −0.636 | 0.399 |

3 × 10 Matrix derived for Sample 102 (C) is below:

| 1.044 | −0.483 | 0.057 | 0.059 | −0.039 | −0.032 | 0.075 | 0.021 | 0.024 | 0.171 |
| 0.024 | 0.896 | 0.108 | 0.015 | 0.047 | −0.071 | −0.128 | 0.019 | 0.155 | 0.350 |
| −0.015 | 0.016 | 0.970 | 0.027 | 0.094 | 0.219 | 0.029 | −0.118 | −0.237 | 0.435 |

The two pictorial outdoor scenes exposed in one-time-use cameras and the single lens reflex camera studio test scene recorded on Samples 001–102 were scanned for each sample with the KODAK PROFESSIONAL PCD™ Film Scanner 1000. The Sample 102 scanner densities were transformed with its unique printing density transform matrix determined of the color negative element samples satisfying invention requirements to reduce image noise in intermediate images recreated from digital records extracted from image areas of color negative elements.

The intermediary image bearing signals derived from Samples 101–102 one-time-use camera-captured images were then directed to a KODAK CRT Digital Color Printer. A non-adaptive digital sharpening filter of constant magnitude was applied uniformly to the image-bearing code values from both scenes for both origination films by the KODAK DIGITAL SCIENCE™ PCMS Image Enhancement Engine computer controlling the printer. The filter magnitude was purposefully chosen to produce a higher level of print sharpness than usually possible through optical printing, particularly if the scene capture by the color negative involves very inexpensive optical components in the camera, such as found in one-time-use cameras. The image files were then written to KODAK EDGE™ 5 Paper at the same magnification as the optical print samples. Following processing and drying, the scan-prints were trimmed to size. The digitally rendered prints derived from Sample 101 of the invention are hereafter referred to as Print C prints, and the digitally rendered prints produced from the control Sample 102 are referred to as Print D prints. Inspection of the digitally rendered Print C and D prints with the reference optical Print B prints revealed that an excellent and precise match of tone scale and effective recording speed had been achieved; in addition the print D prints duplicated well the density and color reproduction of the reference Print B prints derived from the same Sample 102 recorded images. The four prints from each scene were mounted on a mid tone gray display board to facilitate print evaluation by expert viewers.

Evaluations of Print Samples

To visually verify the improvement in the image quality produced by the color negative elements of the invention, the two sets of prints were shown individually to 7 highly qualified color print examiners with extensive experience in producing and evaluating color print images. Table II provides the ratings of quality of the matched prints derived from the two scenes based on the perceptual image performance features of colorfulness, sharpness, and graininess. The rating scale was in integers from 1 to 4 inclusive, with a rating of 1 indicating the color print image with the highest quality for a given parameter and a rating of 4 indicating a color print image with the lowest observed quality for that parameter. That is, a rating of 1 correlated with highest sharpness or the highest colorfulness or the lowest graininess, and a rating of 4 corresponded to the lowest sharpness or the lowest colorfulness or the highest graininess. The integer ratings of the 7 evaluators were then averaged to produce an averaged rating (AR) shown in Table VI.

From Table VI it is apparent that Print C, a digitally rendered print of the inventive element Sample 101, had the lowest ratings of all print samples (indicating best quality) for both colorfulness and sharpness for each of the two scenes. And it was still observed to have a lower graininess rating than the corresponding digitally rendered print, Print D, from the control color negative film of the art, Sample 102, indicating superior (lower) graininess. In both tests, the digitally rendered prints provided substantially increased print sharpness over the reference Print B optical print, overcoming the severe limitation of poor lens quality associated with one-time-use cameras which were comprised of inexpensive components as was typical of such cameras. The average rating was highest of all print samples (lowest performance ranking) for the Print A optical print of the same color negative film element intended for scanning, Sample 101, in the categories of colorfulness and sharpness. This test provided a visual confirmation of the advantages of the invention. It is most surprising and unexpected that the color negative film of the invention intended for scanning and electronic conversion, which provided the poorest optical print for colorfulness and sharpness, was reconverted electronically to provide the most colorful and sharpest prints without sacrificing image noise, or graininess, normally associated with high digital sharpening and high color rendering, or with high chemical interlayer interimage and chemical acutance enhancement in traditional photographic optically-printing systems.

TABLE VI

| Print Sample | Film | Print Method | Colorfulness AR | | Sharpness AR | | Graininess AR | |
|---|---|---|---|---|---|---|---|---|
| | | | Scene 1 | Scene 2 | Scene 1 | Scene 2 | Scene 1 | Scene 2 |
| A | 101 | Optical | 4.0 | 4.0 | 3.6 | 4.0 | 1.4 | 1.3 |
| B | 102(C) | Optical | 2.7 | 1.9 | 3.1 | 2.7 | 3.0 | 2.3 |
| C | 101 | Digital | 1.1 | 1.6 | 1.3 | 1.4 | 2.0 | 2.7 |
| D | 102(C) | Digital | 2.1 | 2.6 | 2.0 | 1.9 | 3.6 | 3.4 |

The invention has been described in detail with particular reference to preferred embodiments thereof, but it will be understood that variations and modifications can be effected within the spirit and scope of the invention.

What is claim:

1. A one-time-use camera preloaded with a color photographic element for producing a color image suited for conversion to an electronic form, electronic correction and subsequent reconversion into a viewable form, said camera comprising a body having a lens and a shutter and preloaded with a light sensitive silver halide color element, said element comprising a support and, coated on the support, a plurality of hydrophilic colloid layers, including radiation-sensitive silver halide emulsion layers, forming layer units for separately recording blue, green and red exposures, each of the layer units containing dye image-forming coupler chosen to produce image dye having an absorption half-peak bandwidth lying in a different spectral region in each layer unit,

WHEREIN the element comprises a development inhibitor releasing compound in at least one layer unit;

the layer units each comprises less than 0.02 millimole/$m^2$ of colored masking coupler, the layer units each exhibits a dye image gamma of less than 1.5, the element exhibits an exposure latitude of at least 2.7 log E, where E is exposure measured in lux-seconds, and a light sensitivity of at least ISO 50, and the gamma ratio of each of the red, green and blue light recording layer units is between 0.80 and 1.20.

2. A camera according to claim 1 wherein the red recording layer unit contains a cyan dye image-forming coupler, the green recording layer unit contains a magenta dye image-forming coupler, and the blue recording layer unit contains a yellow dye image-forming coupler.

3. A camera according to claim 1 wherein said element further comprises a development inhibitor releasing compound in at least one layer unit.

4. A camera according to claim 1 wherein said element further comprises a development inhibitor releasing compound in each layer unit.

5. A camera according to claim 1 wherein at least one of the layer units contains two or more emulsion layers differing in sensitivity.

6. A camera according to claim 5 wherein the emulsion layer having the highest sensitivity is associated with dye image-forming coupler that produces a dye image of a different hue than the dye image-forming coupler associated with remaining of the emulsion layers in the same layer unit.

7. A camera according to claim 5 wherein each of the red recording and green recording layer units are divided into two or more sub-units and radiation-sensitive silver halide emulsions contained in different sub-units of the same layer unit differ in sensitivity.

8. A camera according to claim 7 wherein the sub-units that exhibit a higher sensitivity contain less than a stoichiometric concentration of dye image-forming coupler, based on silver.

9. A camera according to claim 1 wherein the radiation-sensitive silver halide emulsions contain greater than 50 mole percent bromide, based on silver.

10. A camera according to claim 9 wherein the radiation-sensitive emulsions are silver iodobromide emulsions.

11. A camera according to claim 1 wherein the layer units contains less than 0.05 millimole/m$^2$ of colored masking coupler.

12. A camera according to claim 1 wherein said camera further comprises a thrust cartridge for taking up said element after exposure.

13. A camera according to claim 1 wherein said lens and shutter enable exposure of image areas on the element of less than 9 cm$^2$.

14. A camera according to claim 1 wherein said element exhibits a light sensitivity at least ISO 100.

15. A camera according to claim 5 wherein the red and green layer units each contain two or more emulsion layers differing in sensitivity.

16. A camera according to claim 1 wherein at least one of the red and green layer units contains three or more emulsion layers differing in sensitivity.

17. A camera according to claim 1 further comprising a layer unit chosen from the group consisting of a layer unit sensitive to both blue and green light; a layer unit sensitive to both green and red light; and a layer unit sensitive to both blue and red light.

18. A camera according to claim 1 wherein the total quantity of incorporated light sensitive silver halide, measured as silver, is between 2 and 10 m$^2$.

19. A camera according to claim 1 wherein the total quantity of incorporated vehicle is between 5 and 20 g/m$^2$.

20. A camera according to claim 1 wherein said support defines two faces and all the sensitized layers are supplied on a common face of said support.

21. A camera according to claim 20 wherein the total dry thickness of the layers on the sensitized layer-bearing face of said support is between 5 and 30 $\mu$m.

22. A camera according to claim 1 wherein said element comprises a tabular grain emulsion having an average aspect ratio of greater than 2.

23. A camera according to claim 22 wherein each said layer unit comprises a tabular grain emulsion having an average aspect ratio of greater than 2.

24. A camera according to claim 20 wherein said element is supplied in roll form configured to enable upon unrolling, exposure onto the sensitized layer unit bearing face of said support.

25. A camera according to claim 1 wherein said element further comprises a magnetic recording layer.

26. A camera according to claim 1 wherein the total quantity of incorporated light sensitive silver halide in each of the layer units, measured as silver, is at least 0.8 g/m$^2$.

27. A camera according to claim 1 wherein said lens has a focal length of between 10 and 100 mm and a lens aperture of between f/2 and f/32.

28. A camera according to claim 1 wherein said lens has lens MTF of at least 0.6 at a spatial frequency of 20 lines per millimeter at the film exposure plane.

29. A camera according to claim 1 wherein said shutter enables an exposure time of less than 1/60 second.

30. A camera according to claim 1 wherein the color photographic element is a negative working color photographic element.

* * * * *